ature information. After to-be-verified biometric information is

(12) United States Patent
Yamada et al.

(10) Patent No.: US 7,646,893 B2
(45) Date of Patent: Jan. 12, 2010

(54) BIOMETRIC INFORMATION APPARATUS NARROWING BIOMETRIC INFORMATION OF REGISTERED USERS USED WHEN AUTHORIZING A CANDIDATE BASED ON FEATURES EXTRACTED FROM THE BIOMETRIC INFORMATION OF THE CANDIDATE

(75) Inventors: Shigefumi Yamada, Kawasaki (JP); Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 780 days.

(21) Appl. No.: 10/970,065

(22) Filed: Oct. 22, 2004

(65) Prior Publication Data

US 2005/0223236 A1 Oct. 6, 2005

(30) Foreign Application Priority Data

Mar. 30, 2004 (JP) ............................. 2004-100919

(51) Int. Cl.
*G06K 9/00* (2006.01)
(52) U.S. Cl. ...................... 382/115; 382/116; 382/117; 382/118; 382/119; 382/120; 382/121; 382/122; 382/123; 382/124; 382/125; 382/126; 382/127
(58) Field of Classification Search ................. 382/115, 382/116, 117, 118, 119, 127
See application file for complete search history.

(56) References Cited

U.S. PATENT DOCUMENTS 5,905,807 A * 5/1999 Kado et al. .................. 382/118

(Continued)

FOREIGN PATENT DOCUMENTS

JP 3-217983 9/1991

(Continued)

OTHER PUBLICATIONS

Ratha N K et al: "A Real-Time Matching System for Large Fingerprint Databases" IEEE Transactions on Pattern Analysis and Maching Intelligence, IEEE Service Center, Los Alamitos, CA, US, vol. 18, No. 8, Aug. 1, 1996, pp. 799-812, XP00632861, ISSN: 0162-8828.

(Continued)

*Primary Examiner*—Samir A. Ahmed
*Assistant Examiner*—Edward Park
(74) *Attorney, Agent, or Firm*—Staas & Halsey LLP

(57) ABSTRACT

Every time to-be-verified biometric is input, the apparatus reflects the degree of fluctuation in the to-be-verified biometric information on narrowing down of registered feature information. After to-be-verified biometric information is input through the a biometric information input unit, the to-be-verified sub-feature information obtaining unit extracts two or more items of sub-feature information from the to-be-verified biometric information. Based on the pieces of to-be-verified sub-feature information, the to-be-verified sub-feature information assessing unit assesses an acquisition stability of each item of to-be-verified sub-feature information. According to the acquisition stability assessment, the registered feature information narrowing unit selects one or more pieces of registered feature information to be subjected to comparison/verification, thereby narrowing down the registered feature information. The apparatus applicable to 1-to-N verification using biometric information such fingerprints, palm prints, iris patterns, facial images, voice patterns, and blood vessel patterns.

32 Claims, 23 Drawing Sheets

U.S. PATENT DOCUMENTS

| | | | |
|---|---|---|---|
| 6,002,785 A | 12/1999 | Ucida | 382/124 |
| 6,067,369 A | 5/2000 | Kaimei | |
| 6,091,839 A | 7/2000 | Uchida | 382/125 |
| 6,332,038 B1* | 12/2001 | Funayama et al. | 382/190 |
| 7,133,542 B2 | 11/2006 | Takeuchi et al. | |
| 2002/0034319 A1 | 3/2002 | Tumey et al. | |
| 2002/0048390 A1 | 4/2002 | Ikegami | 382/124 |
| 2003/0061233 A1 | 3/2003 | Manasse et al. | |
| 2003/0076985 A1* | 4/2003 | Moghaddam | 382/124 |
| 2003/0103652 A1* | 6/2003 | Lee et al. | 382/118 |

FOREIGN PATENT DOCUMENTS

| | | |
|---|---|---|
| JP | 9-114981 | 5/1997 |
| JP | 9-179978 | 7/1997 |
| JP | 10-177650 | 6/1998 |
| JP | 2002-133416 | 5/2002 |
| JP | 2002-197460 | 7/2002 |
| JP | 2003-30661 | 1/2003 |
| JP | 2003-186847 | 7/2003 |
| WO | WO 02/29720 | 4/2002 |

OTHER PUBLICATIONS

European Search Report issued on Mar. 17, 2009 in corresponding European Patent Application 04256639.8.

Japanese Patent Office Notice of Reasons for Rejection, mailed Oct. 21, 2008 and issued in corresponding Japanese Patent Application No. 2004-100919.

* cited by examiner

| ID | REGISTERED FEATURE INF. | ITEM A | ITEM B | ITEM C |
|---|---|---|---|---|
| 1 | DATA 1 | a1 | b1 | c1 |
| 2 | DATA 2 | a2 | b2 | c2 |
| 3 | DATA 3 | a3 | b3 | c3 |

|         | ITEM A      | ITEM B      | ITEM C      |
|---------|-------------|-------------|-------------|
| DATA 1  | CATEGORY A1 | CATEGORY B2 | CATEGORY C2 |
| DATA 2  | CATEGORY A2 | CATEGORY B2 | CATEGORY C3 |
| DATA 3  | CATEGORY A3 | CATEGORY B1 | CATEGORY C1 |

|                              | ITEM A      | ITEM B      | ITEM C      |
|------------------------------|-------------|-------------|-------------|
| WEIGHT                       | $W_A$       | $W_B$       | $W_C$       |
| TO-BE-VERIFIED SUB-FEATURE INF. | CATEGORY A1 | CATEGORY B2 | CATEGORY C3 |
| REGISTERED SUB-FEATURE INF.  | CATEGORY A1 | CATEGORY B1 | CATEGORY C3 |

BIOMETRIC INFORMATION APPARATUS NARROWING BIOMETRIC INFORMATION OF REGISTERED USERS USED WHEN AUTHORIZING A CANDIDATE BASED ON FEATURES EXTRACTED FROM THE BIOMETRIC INFORMATION OF THE CANDIDATE

BACKGROUND OF THE INVENTION

1. Field of the Invention

The present invention relates to user authentication technology using biometric information such as fingerprints, palm prints, iris patterns, facial images, voice patterns, and blood vessel patterns. The invention relates particularly to a technique applicable to 1-to-N (1-to-many) verification, in which registered feature information of an object user, out of two or more pieces of registered feature information (previously extracted from two or more pieces of biometric information and then registered/stored), is identified based on to-be-verified biometric information input by the object user.

2. Description of the Related Art

Recently, biometric verification and authentication, utilizing human biometric information, has been widely used in personal computer (PC) log-in systems, and controlled access systems. The biometric information used is, for example, fingerprints, palm prints, iris patterns, facial images, voice patterns, and blood vessel patterns. Among these various types of biometric information, fingerprint verification is one of the most practical biometric authentication techniques.

In a common type of fingerprint verification, users input their ID (Identification) information such as user names before they scan their fingerprints. In such 1-to-1 verification, fingerprint data (feature information extracted from a fingerprint image) of each user is previously registered/stored in association with the user's ID. At the time of verification, the user inputs both his ID and his fingerprint image, and registered fingerprint data that is associated with the input ID information is then read out. At the same time, to-be-verified fingerprint data is extracted from the user's input fingerprint image, and then, the registered fingerprint data and the to-be-verified fingerprint data are compared with each other, whereby the user is authenticated (the user is identified as an authorized user whose fingerprint is registered).

Therefore, in order to perform this 1-to-1 verification, it is necessary to prepare a fingerprint sensor with a means for the user to input his ID information therethrough, such as a keyboard, keypad, and ID card reader. This means that such a keyboard or a keypad needs to be installed, together with the fingerprint sensor, at a place where the fingerprint verifying system is installed (a place where the PC is installed or an entrance/exit for access control), thereby incurring some extra costs and work in the installation. In addition, users are reluctant to obtain such IDs.

In contrast to this, there is also a 1-to-N (1-to-many) verification technique. In this technique, users need to input their fingerprint alone, without inputting any ID information. With this 1-to-N verification, it is not necessary for users to obtain any ID information beforehand, and the necessity of a keyboard or a keypad for inputting the ID information is also eliminated. In typical 1-to-N verification, to-be-verified fingerprint data (to-be-verified feature information) is extracted from a to-be-verified fingerprint image input by a user who is to be verified. The to-be-verified fingerprint data thus extracted is compared with all the pieces of previously registered fingerprint data (registered feature information), until a piece of registered fingerprint data that agrees with the object to-be-verified fingerprint data is found, thereby identifying/verifying the user.

However, such 1-to-N verification has the following problems. Increases in number of registered fingerprint data pieces will cause increases in time required for comparison/verification. Thus, a technique for realizing efficient comparison/verification in a short time with high accuracy has been desired.

In view of this, there has been developed a technique for suppressing increases in comparison/verification time in 1-to-N verification. For example, the following is a technique of narrowing the number of registered fingerprint data to be subjected to comparison with the to-be-verified fingerprint data. Specifically, at enrollment, to-be-registered fingerprint data (for example, feature information including minutiae such as ridge bifurcations and end points) is extracted from a to-be-registered fingerprint image, and one or more items (for example, fingerprint pattern types, distances between minutia points) of to-be-verified sub-feature information, other than the above fingerprint data, are also extracted. On the basis of such sub-feature information, the to-be-registered fingerprint data is categorized (grouped) and registered.

After that, at the time of verification, to-be-verified feature information (to-be-verified fingerprint data) and to-be-verified sub-feature information are extracted from a to-be-verified fingerprint image input by an object user. On the basis of the thus extracted to-be-verified sub-feature information, a group of registered fingerprint data to which the to-be-verified fingerprint data is considered to belong is selected and read out, whereby the number of registered fingerprint data to be subjected to comparison with the to-be-verified fingerprint data is narrowed down.

After that, the to-be-verified fingerprint data is compared with one or more pieces of registered fingerprint data that belong to the read-out group. If any piece of registered fingerprint data that agrees to the to-be-verified fingerprint data is found, the object user is identified.

In this manner, comparison for verification is performed between the registered fingerprint data having been narrowed down by use of sub-feature information and the to-be-verified fingerprint data, so that the necessity of comparing the to-be-verified fingerprint data with all the registered fingerprint data is eliminated, thereby suppressing increases in comparison/verification time required in 1-to-N verification.

Here, generally speaking, when biometric information verification, such as fingerprint verification, is performed, biometric information input by an object user at his verification is under influence of a condition of the user (for example, how the fingertip is pressed onto the fingerprint sensor) and of environmental condition (temperature, humidity, and so on) at the time the information is input, and fluctuates and varies among input occasions. Accordingly, to-be-verified sub-feature information, which is obtained from such unstable biometric information, naturally tends to fluctuate, too, so that failure can occur in narrowing down of registered fingerprint data by use of to-be-verified sub-feature information.

Against this backdrop, the previous art employs a technique of previously categorizing (grouping) registered fingerprint data according to two or more items of sub-feature information. At user verification, two or more items of to-be-verified sub-feature information, extracted at user verification, are assessed in view of the aforementioned two or more items of to-be-verified sub-feature information, in order to prevent the occurrence of failure due to the aforementioned fluctuation.

More specifically, more than one item of to-be-verified sub-feature information is extracted at verification and is compared with the more than one item of registered sub-feature information that is used in registered fingerprint data categorization (grouping), to calculate their similarity (whether their values are close/whether they belong to the same group). The similarities obtained for the individual items of sub-feature information are multiplied by weights corresponding to the individual items, and the weighted similarities are summed to obtain an assessment value. Such an assessment value is calculated for each group of registered fingerprint data, and on the basis of the calculated assessment values, a group of registered fingerprint data to which the object to-be-verified fingerprint data is considered to belong to is selected. For example, a group whose assessment value is the greatest is selected.

At that time, in previous arts (for example, see the following patent applications 1 and 2), the values of weights by which the similarities of the different items of sub-feature information are multiplied, are set depending upon statistical values obtained from past information accumulated in an existing fingerprint database. For instance, on the basis of the past information, a successful verification rate [a rate (possibility) at which a match decision is made at verification] is calculated as the statistical value for each item of sub-feature information. Higher weights are assigned to sub-feature information with higher successful verification rates, while lower weights are assigned to sub-feature information with lower successful verification rates.

[Patent Application 1] Japanese Patent Application Publication No. HEI 9-114981

[Patent Application 2] Japanese Patent Application Publication No. HEI 9-179978

However, the above technique still has the following problem. The degree of fluctuation in input biometric information (fingerprint image) greatly varies among individual users, and the degree also depends on input occasions of the biometric information. Accordingly, if the past statistical values (successful verification rates in the past) are used as the aforementioned weights, it is impossible to reflect such interpersonal differences in the fluctuation and the degree of the fluctuation depending upon input occasions on the values of the above weights.

Against this backdrop, a technique has been desired in which weights are newly assigned, every time users input to-be-verified biometric information (fingerprint images), according to the input to-be-verified biometric information. This arrangement will make it possible to reflect the aforementioned fluctuation degrees on the weights to be assigned. Further, it resultantly becomes possible not only to prevent the occurrence of failures in narrowing down the number of registered feature information items, but also to realize more accurate and reliable narrowing down of the information (registered fingerprint data).

SUMMARY OF THE INVENTION

With the foregoing problems in view, one object of the present invention is to make it possible, at the time of 1-to-N verification of biometric information, to reflect fluctuation in input to-be-verified biometric information, or variation in input to-be-verified biometric information among input occasions, on narrowing down of registered feature information to be subjected to comparison, so that false narrowing down is reliably prevented to provide more accurate and dependable narrowing down of the registered feature information.

In order to accomplish the above object, according to the present invention, there is provided a biometric information verifying apparatus for authorizing a user, utilizing biometric information, which apparatus is adapted to be employed in a system where (i) registered feature information, which is obtained from biometric information for registry that is acquired from the user at enrollment, and (ii) a plurality of items of registered sub-feature information, which is obtained from the biometric information for registry, are previously registered and stored in association with each other, which apparatus comprises, a biometric information input unit for inputting to-be-verified biometric information; a to-be-verified feature information obtaining unit which obtains to-be-verified feature information from the to-be-verified biometric information input by said biometric information input unit; a to-be-verified sub-feature information obtaining unit which obtains a plurality of types of to-be-verified sub-feature information from the to-be-verified biometric information input by said biometric information input unit; a to-be-verified sub-feature information assessing unit which assesses acquirement stability of an individual item of to-be-verified sub-feature information, based on the plurality of items of to-be-verified sub-feature information obtained by said to-be-verified sub-feature information obtaining unit; a registered feature information narrowing unit which selects one or more pieces of registered feature information, of the previously registered feature information of the users, to be subjected to comparison with the to-be-verified feature information obtained by said to-be-verified feature information obtaining unit, based on the plurality of items of to-be-verified sub-feature information and the plurality of items of registered sub-feature information, and on the acquirement stability assessment result obtained by said to-be-verified sub-feature information assessing unit; and a comparing unit which compares said one or more pieces of registered feature information selected by said registered feature information narrowing unit and the to-be-verified feature information obtained by said to-be-verified feature information obtaining unit.

As a preferred feature, the registered feature information narrowing unit includes: a sub-feature information comparing unit which compares the plurality of items of to-be-verified sub-feature information and the plurality of items of registered sub-feature information associated with each piece of registered feature information, respectively, to obtain a comparison result value for each item of sub-feature information; a match degree calculating unit which calculates a match degree between the plurality of items of to-be-verified sub-feature information and the plurality of items of registered sub-feature information for each piece of registered feature information, based on the comparison result values obtained by said sub-feature information comparing unit and on the acquirement stability assessment result obtained by said to-be-verified sub-feature information assessing unit; and a registered feature information selecting unit which selects said one or more pieces of registered feature information according to the match degrees calculated by said match degree calculating unit.

As another preferred feature, said match degree calculating unit weights the comparison result values, each obtained by said sub-feature information comparing unit for each item of sub-feature information, according to the acquirement stability assessment result, and calculates a total sum of weighted comparison result values to obtain a calculation result as the match degree for each piece of registered feature information. Further, the greater the acquirement stability, the greater the weights assigned to the comparison result values.

As still another preferred feature, the biometric information verifying apparatus further comprises: a boundary value setting unit which provides one or more boundary values for each item of sub-feature information; and a sub-feature information categorizing unit which categorizes, for each item of sub-feature information, the registered sub-feature information and the to-be-verified sub-feature information according to the boundary values provided by said boundary value setting unit. The sub-feature information comparing unit compares, for each item of sub-feature information, the to-be-verified sub-feature information categorization result obtained by said sub-feature information categorizing unit with the registered sub-feature information categorization result obtained by said sub-feature information categorizing unit. At that time, said to-be-verified sub-feature information assessing unit evaluates, for each item of sub-feature information, whether or not any of such boundary values is present in a specific range of values whose center value is a value of each item of to-be-verified sub-feature information, as the acquirement stability.

As a further preferred feature, the biometric information input unit inputs to-be-verified biometric information obtained from a same body part more than one time to acquire more than one piece of to-be-verified biometric information. The to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information. The apparatus further comprises a statistical value calculating unit which calculates, for each item of sub-feature information, a statistical value of said each item of to-be-verified sub-feature information, based on the sets of to-be-verified sub-feature information pieces obtained from the same body part by said to-be-verified sub-feature information obtaining unit, and the to-be-verified sub-feature information assessing unit assesses, for each item of sub-feature information, the acquirement stability, based on the statistical value calculated by said statistical value calculating unit.

As a generic feature, there is provided a biometric feature information narrowing apparatus adapted to be employed in a system where (i) registered feature information, which is obtained from biometric information for registry that is acquired from the user at enrollment, and (ii) a plurality of items of registered sub-feature information, which is obtained from the biometric information for registry, are previously registered and stored in association with each other, which apparatus is operable to narrow registered feature information to be subjected to comparison when biometric user verification is performed, which apparatus comprises, a biometric information input unit for inputting to-be-verified biometric information; a to-be-verified sub-feature information obtaining unit which obtains a plurality of items of to-be-verified sub-feature information from the to-be-verified biometric information input by said biometric information input unit; a to-be-verified sub-feature information assessing unit which assesses acquirement stability of an individual item of to-be-verified sub-feature information, based on the plurality of items of to-be-verified sub-feature information obtained by said to-be-verified sub-feature information obtaining unit; and a registered feature information narrowing unit which selects one or more pieces of registered feature information, to be subjected to the comparison, based on the plurality of items of to-be-verified sub-feature information and the plurality of items of registered sub-feature information, and on the acquirement stability assessment result obtained by said to-be-verified sub-feature information assessing unit.

As another generic feature, there is provided a recording medium in which is recorded a biometric feature information narrowing program for a computer to function as a biometric feature information narrowing apparatus adapted to be employed in a system where (i) registered feature information, which is obtained from biometric information for registry that is acquired from the user at enrollment, and (ii) a plurality of items of registered sub-feature information, which is obtained from the biometric information for registry, are previously registered and stored in association with each other, which apparatus is operable to narrow registered feature information to be subjected to comparison when biometric user verification is performed, whish program instructs the computer to function as the following: a to-be-verified sub-feature information obtaining unit which obtains a plurality of items of to-be-verified sub-feature information from the to-be-verified biometric information input by said biometric information input unit; a to-be-verified sub-feature information assessing unit which assesses acquirement stability of an individual item of to-be-verified sub-feature information, based on the plurality of items of to-be-verified sub-feature information obtained by said to-be-verified sub-feature information obtaining unit; and a registered feature information narrowing unit which selects one or more pieces of registered feature information, of the previously registered feature information, to be subjected to the comparison, based on the plurality of items of to-be-verified sub-feature information and the plurality of items of registered sub-feature information, and on the acquirement stability assessment result obtained by said to-be-verified sub-feature information assessing unit.

According to the present invention, after inputting of to-be-verified biometric information, more than one item of to-be-verified sub-feature information is extracted from the to-be-verified biometric information, and on the basis of the to-be-verified sub-feature information, the acquisition stability of each item of to-be-verified sub-feature information is assessed. In accordance with the acquisition stability assessment result, one or more pieces of registered feature information to be subjected to comparison for verification are selected, the registered feature information thereby being narrowed down. That is, every time to-be-verified biometric information is input, it is evaluated which one of the more than one item of to-be-verified sub-feature information is stable in its acquisition (low in fluctuation/variation), and to-be-verified sub-feature information of the items having higher acquisition stabilities is assigned higher weights. In this manner, narrowing down of the registered data is performed.

As a result, at the time of 1-to-N (1-to-many) biometric information verification, every time to-be-verified biometric information is input, fluctuation of the to-be-verified biometric information is reflected on narrowing down of registered feature information as a result of the acquisition stability assessment, so that false narrowing down of registered feature information is reliably prevented, and accurate and reliable narrowing down of the information becomes available.

Other objects and further features of the present invention will be apparent from the following detailed description when read in conjunction with the accompanying drawings.

DESCRIPTION OF THE PREFERRED EMBODIMENT(S)

Embodiments of the present invention will now be described with reference to the relevant accompanying drawings.

Figure 4:
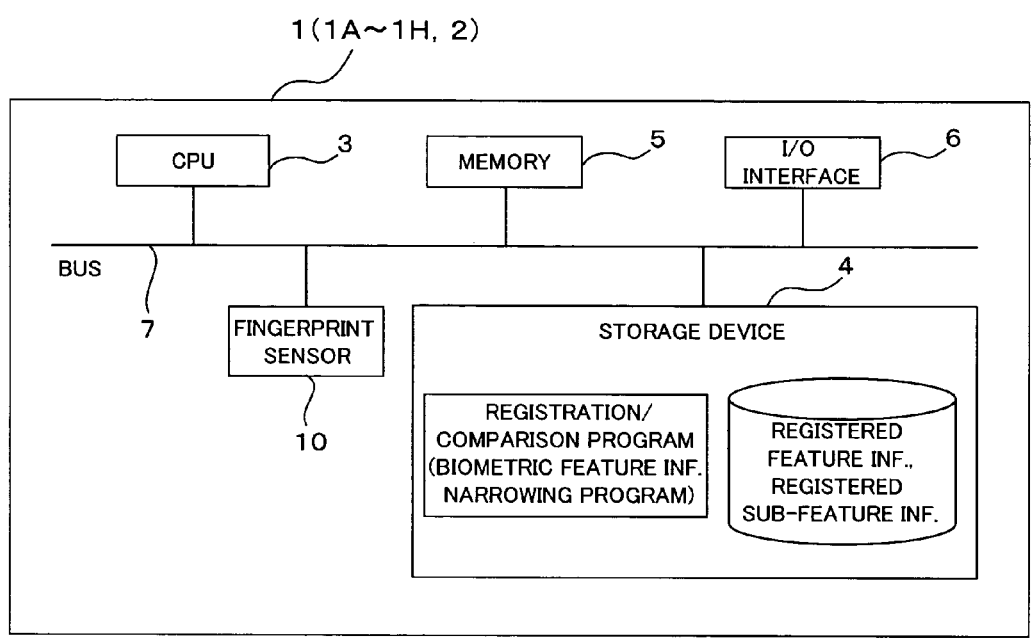
FIG. 4 is a block diagram showing a hardware construction of a system (personal computer) that realizes a biometric information verifying apparatus (biometric feature information narrowing apparatus) and a biometric information registering apparatus of the embodiments.

First of all, referring to FIG. 4, a description will be made of a hardware construction of a system (personal computer) that realizes biometric information verifying apparatus (biometric feature information narrowing apparatus) and a biometric information registering apparatus of the first through the eighth embodiment. FIG. 4 is a block diagram showing the hardware construction, and the personal computer 1 of FIG. 4, which realizes functions of biometric information verifying apparatuses (biometric feature information narrowing apparatuses) 1A through 1H and a biometric information registering apparatus 2, including a CPU (Central Processing Unit) 3, a storage device 4, a memory 5, an I/O interface 6, a bus 7, and a fingerprint sensor 10.

As will be detailed later, the CPU 3 executes a predetermined application program so as to function as a biometric information verifying apparatus, 1A through 1H, and as a biometric information registering apparatus 2. The application programs executed here are a verification program (biometric feature information narrowing program), which realizes a function of a biometric information verifying apparatus, 1A through 1H, and a registration program, which realizes a function of a biometric information registering apparatus 2.

The storage device (data storage unit) 4, which includes a hard disc or the like, stores the application programs (registration/verification programs) therein. As will be detailed later with reference to FIG. 3, the device 4 also has a function as a biometric information registering apparatus 2, and serves as a data storage unit which registers/stores feature information (registered feature information) and sub-feature information (registered sub-feature information) therein.

The memory 5, which includes a RAM (Random Access Memory) or the like, is used as a working area when the CPU 3 executes the foregoing application programs. The I/O interface 6 carries out a function of an I/O interface connected to various types of external equipment such as a printer and an external storage device. The bus 7 communicably interconnects the CPU 3, storage device 4, memory 5, I/O interface 6, and fingerprint sensor 10.

The fingerprint sensor (biometric information inputting unit) 10 attached to the personal computer 1 to input fingerprints therethrough at user enrollment (biometric information for registry) and/or user verification (to-be-verified biometric information). That is, the biometric information verifying apparatus, 1A through 1H, and the biometric information registering apparatus 2 of the present embodiments (first through eighth embodiments) has a hardware construction of a common personal computer with a fingerprint sensor 10 attached thereto.

Figures 2, 3:
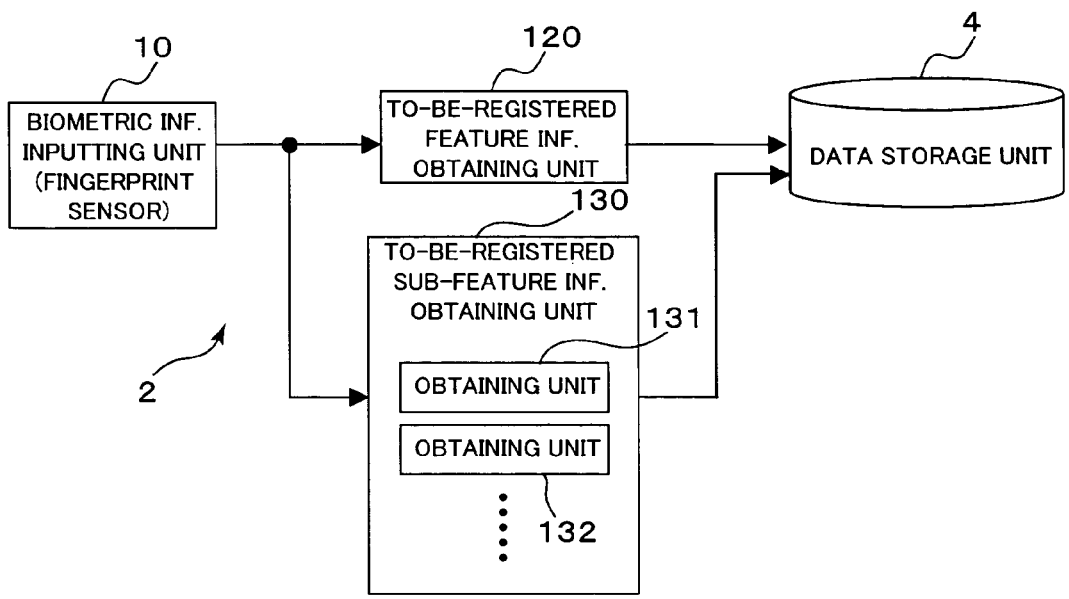
FIG. 2 is a block diagram showing a functional construction of a biometric information registering apparatus of the embodiments of the present invention.
FIG. 3 is a table indicating a format of registration/storage of registered feature information and registered sub-feature information that are obtained by the biometric information registering apparatus of the embodiments.
Figure 5:
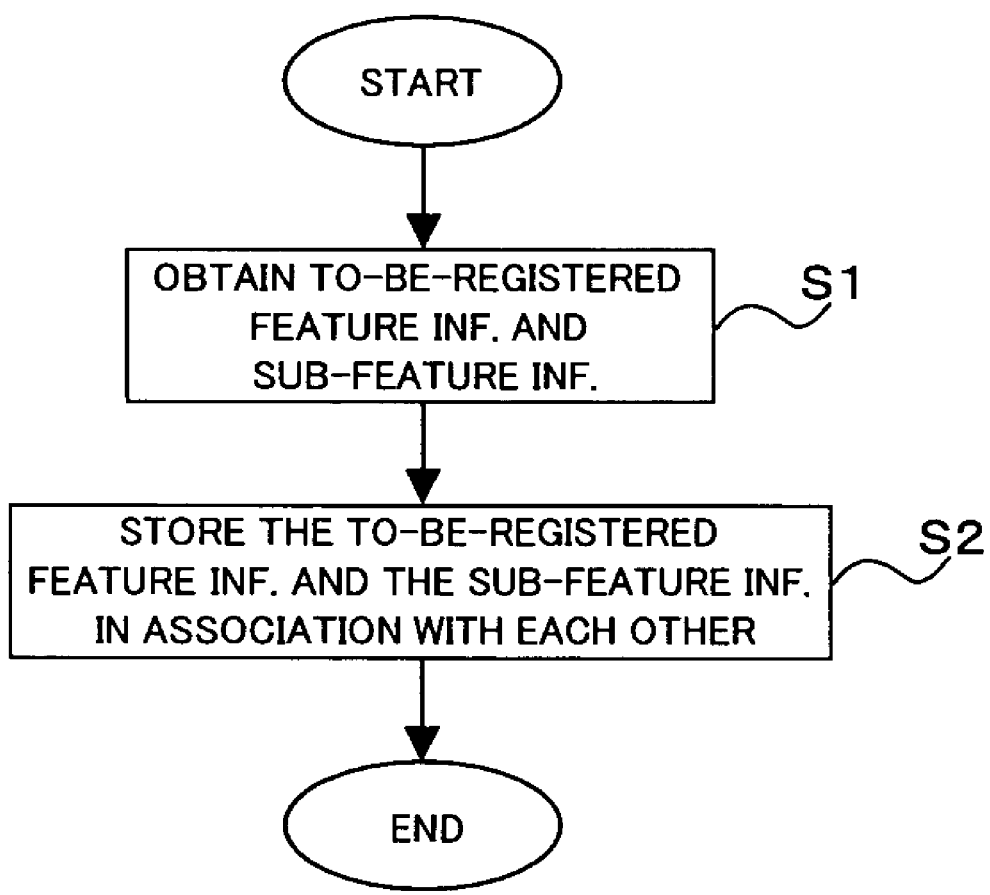
FIG. 5 is a flowchart indicating basic procedures of biometric information registration according to the embodiments.
Figure 6:
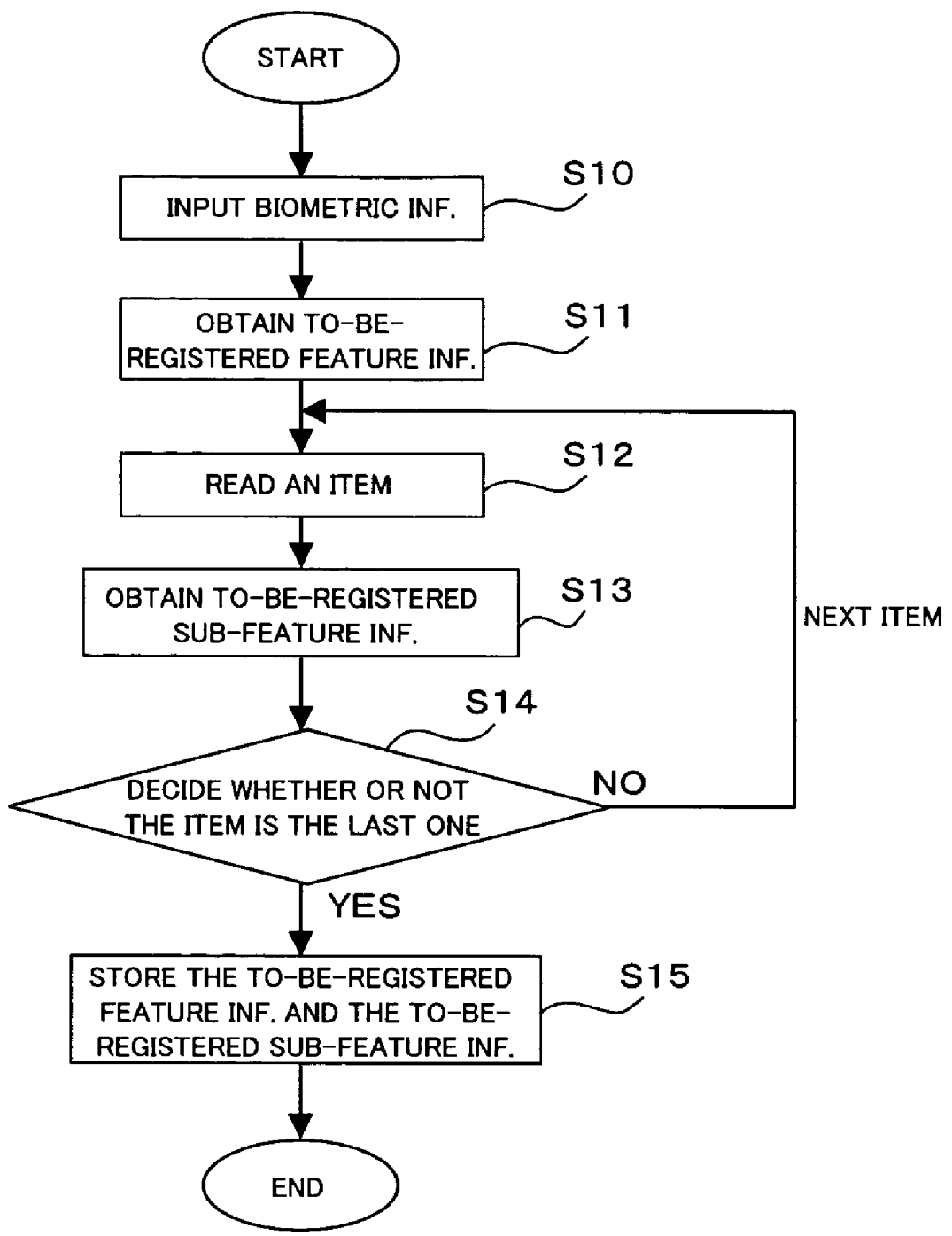
FIG. 6 is a flowchart indicating biometric information registration procedures according to the embodiments.

Next, referring to FIG. 2 through FIG. 6, a description will be made hereinbelow of a biometric information registering apparatus 2 of the present embodiments. FIG. 2 is a block diagram showing a functional construction of a biometric information registering apparatus 2; FIG. 3 is a table indicating a format in which feature information and sub-feature information are stored in the storage device 4 by the biometric information registering apparatus 2; FIG. 5 is a flowchart indicating the basic operation (basic procedures of biometric information registration) of the biometric information registering apparatus 2; FIG. 6 is a flowchart detailing more of the operation (basic procedures of biometric information registration) of the biometric information registering apparatus 2.

As shown in FIG. 2, the biometric information registering apparatus 2 obtains to-be-registered biometric information from biometric information (fingerprints in the present embodiments) that is obtained from users to be enrolled as authorized users. Information obtained and extracted from the to-be-registered biometric information is stored in a data storage unit (storage device 4) for future use. As is already described, the biometric information registering apparatus 2 is realized by a personal computer 1 with a fingerprint sensor 10 attached thereto, and it has functions as a to-be-registered feature information obtaining unit 120 and as a to-be-registered sub-feature information obtaining unit 130. These functions are realized by the CPU 3 by executing the aforementioned registration programs.

The to-be-registered feature information obtaining unit 120 extracts and obtains to-be-registered feature information (to-be-registered fingerprint data; for example, feature information including, for example, ridge bifurcations, ridge end points) from to-be-registered biometric information (fingerprint images) input from the fingerprint sensor 10.

The to-be-registered sub-feature information obtaining unit 130 has two or more obtaining units 131, 132, ..., each of which extracts one item of to-be-registered sub-feature information (property information), which is different from the above feature information, from the input to-be-registered biometric information (fingerprint image) input through the fingerprint sensor 10.

Here, provided that the biometric information sampled is a fingerprint, the following items of sub-feature information are obtained by the to-be-registered sub-feature information obtaining unit 130:

a) fingerprint pattern type;
b) the number of minutia points extracted by the to-be-registered feature information obtaining unit 120;
c) distances between the minutia points;
d) the area of the sensor surface of the fingerprint sensor 10 which is in contact with an object fingertip;
e) the thickness of ridges; and
f) the number of ridges.

At user enrollment, the to-be-registered feature information obtaining unit 120 and the to-be-registered sub-feature information obtaining unit 130 obtain to-be-registered feature information and more than one item of to-be-registered sub-feature information, respectively (see step S1 of FIG. 5).

The to-be-registered feature information, to-be-registered sub-feature information, and ID (identification number) are associated with one another, and stored in the data storage unit (storage device, database) 4 in a table-like format of FIG. 3 (see step S2 of FIG. 5).

In FIG. 3, three items A, B, and C of sub-feature information are obtained. To-be-registered feature information (data 1) with ID1 is associated with sub-feature information item values of a1, b1, and c1 (of items A, B, and C, respectively); to-be-registered feature information (data 2) with ID2 is associated with sub-feature information item values of a2, b2, and c2 (of items A, B, and C, respectively); to-be-registered feature information (data 3) with ID3 is associated with sub-feature information item values of a3, b3, and c3 (of items A, B, and C, respectively).

Next, referring to the flowchart (steps S10 through S15) of FIG. 6, a description will now be made of the operation (biometric information registration procedures) of the biometric information registering apparatus 2.

At enrollment, a user inputs his biometric information (fingerprint image) through the fingerprint sensor 10 (step S10). The to-be-registered feature information obtaining unit 120 extracts and obtains to-be-registered feature information from the input to-be-registered biometric information (step S11). Further, the to-be-registered sub-feature information obtaining unit 130 (obtaining unit 131, 132, ...) obtains more than one item of to-be-registered sub-feature information from the input to-be-registered biometric information (steps S12 through S14).

At this time, items of sub-feature information to be obtained are read out one by one (step S12), and to-be-registered sub-feature information of the read-out item is then obtained by the to-be-registered sub-feature information obtaining unit 130 (corresponding obtaining units 131, 132, ...)(step S13).

After that, it is evaluated whether or not the present item, which is the current object of the sub-feature information acquisition, is the last one, that is, whether or not all the items of to-be-registered sub-feature information have been obtained (step S14). If the evaluation result is negative (NO route of step S14), the process returns to step S12, whereas if the evaluation result is positive (YES route of step S14), the to-be-registered feature information obtained at step S11, the to-be-registered sub-feature information of the different items obtained at steps S12 through S14, and an ID, are associated with one another, and stored in the data storage unit 4 in the format shown in FIG. 3 (step S15).

As described above, in the biometric information registering apparatus 2, to-be-registered feature information, to-be-registered sub-feature information, and IDs, of a great number of authorized users are stored in the data storage unit 4 in association with one another. The biometric information verifying apparatuses 1A through 1H of the first through eighth embodiments, respectively, performs 1-to-N comparison (1-to-N verification) between to-be-verified feature information, which is obtained at user verification, and the registered feature information stored in the data storage unit 4.

[1] First Embodiment

Figure 1:
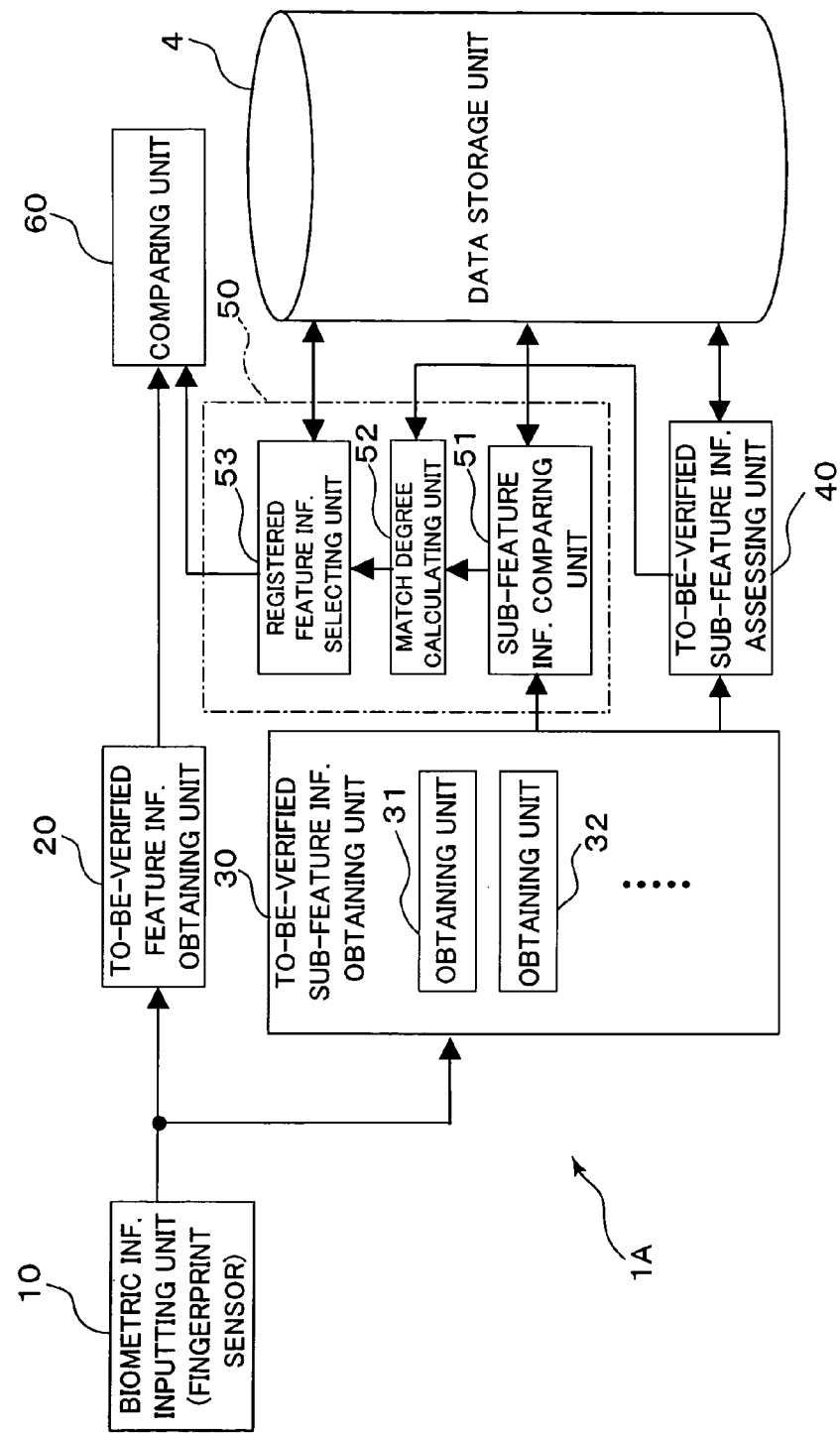
FIG. 1 is a block diagram showing a functional construction of a biometric information verifying apparatus (biometric feature information narrowing apparatus) of a first embodiment of the present invention.

FIG. 1 is a block diagram showing a functional construction of a biometric information verifying apparatus (biometric feature information narrowing apparatus) of a first embodiment of the present invention. The biometric information verifying apparatus (biometric information narrowing apparatus) 1A of the first embodiment of FIG. 1 performs 1-to-N comparison (1-to-N verification) between to-be-verified feature information, which is obtained at user verification, and registered feature information stored in the data storage unit 4. The apparatus is realized by a personal computer 1 with a fingerprint sensor 10 attached thereto, and is provided with functions as a to-be-verified feature information obtaining unit 20, to-be-verified sub-feature information obtaining unit 30, to-be-verified sub-feature information assessing unit 40, registered feature information narrowing unit 50, and comparison unit 60. These functions are realized by the CPU 3 by executing verification programs including a biometric feature information narrowing program.

The to-be-verified feature information obtaining unit 20 extracts and obtains to-be-verified feature information (to-be-verified fingerprint data; for example, feature information including, for example, ridge bifurcations, ridge end points) from to-be-verified biometric information (fingerprint images) input from the fingerprint sensor 10.

The to-be-verified sub-feature information obtaining unit 30 has two or more obtaining units 31, 32, . . ., each of which extracts one item of to-be-verified sub-feature information, which is different from the feature information, from the input to-be-verified biometric information (fingerprint image) input through the fingerprint sensor 10. The thus obtained items of the to-be-verified sub-feature information are the same as those (for example, items A, B, and C, as already shown) of the registered sub-feature information stored in the data storage unit 4. The detailed description was already made above.

The to-be-verified sub-feature information assessing unit 40 assesses the acquisition stability of individual items of to-be-verified sub-feature information, based on the to-be-verified sub-feature information of more than one item obtained by the to-be-verified sub-feature information obtaining unit 30.

Here, the "acquisition stability" of to-be-verified sub-feature information reflects/represents fluctuation of the to-be-verified biometric information. The information relates to the possibility that the same or approximately the same to-be-verified sub-feature information as the currently obtained to-be-verified sub-feature will be obtained at the next information acquisition. In other words, it is the degree of stability (possibility) with which similar to-be-verified sub-feature information is repeatedly obtained, without varying among different times of input of the to-be-verified biometric information, and the possibility that registered sub-feature information similar to the to-be-verified biometric information is stably selected. This acquisition stability should be assessed for each item of to-be-verified sub-feature information. Its specific example will be detailed later in the second, the third, and the fifth embodiment.

The registered feature information narrowing unit 50 selects, out of the previously registered feature information stored in the data storage unit 4, one or more pieces of registered feature information that are to be compared with the to-be-verified feature information obtained by the to-be-verified feature information obtaining unit 20. The selection is made based on the to-be-verified sub-feature information of more than one item and the registered sub-feature information of more than one item, and also according to the acquisition stability assessment result obtained by the to-be-verified sub-feature information assessing unit 40.

The registered feature information narrowing unit 50 includes a sub-feature information comparing unit 51, a match degree calculating unit 52, and a registered feature information selecting unit 53.

The sub-feature information comparing unit 51 compares the different items of to-be-verified sub-feature information with a set of different items of registered sub-feature information associated with each piece of registered feature information. Here, all the registered sub-feature information sets associated with all the pieces of registered feature information in the data storage unit 4 are subjected to the comparison. The sub-feature information comparing unit 51 outputs, for each item of sub-feature information, a first specific value (for example, "1") as the comparison result value, if the to-be-verified sub-feature information agrees to the registered sub-feature information. On the other hand, if the two kinds of information disagree, the sub-feature information comparing unit 51 outputs a second specific value (for example, "0") as the comparison result, the second specific value being smaller than the first specific value.

On the basis of the comparison result value obtained by the sub-feature information comparing unit 51 and of the acquisition stability assessment result obtained by the to-be-verified sub-feature information assessing unit 40, the match degree calculating unit 52 calculates a match degree (a value indicating how well sub-feature information pieces agree) between the more than one item of to-be-verified sub-feature information and the more than one type of registered sub-feature information. More specifically, the match degree calculating unit 52 weights the comparison results obtained, one for each item of sub-feature information, by the sub-feature information comparing unit 51, depending upon the acquisition stability assessment results. The match degree calculating unit 52 then calculates a sum of the weighted comparison results as the degree of matching or match degree.

At that time, the higher the acquisition stability is, the higher weight the comparison result values are given. That is, the acquisition stability is consistent with the priority of each item of sub-feature information. The match degree calculating unit 52 assigns weights to the comparison result values, in such a manner that the comparison result values of sub-feature information items having higher acquisition stabilities are reflected on the match degree, which is a parameter of registered feature information selection, with higher priorities. The match degree is calculated for each set of to-be-registered sub-feature information pieces of different items (that is, each piece of registered feature information).

The registered feature information selecting unit 53 selects one or more pieces of registered feature information, of the registered feature information pieces previously registered in the data storage unit 4, depending upon the match degree obtained by the match degree calculating unit 52. For example, the registered feature information selecting unit 53 selects registered feature information pieces that are associated with sets of registered sub-feature information having match degrees greater than a specific threshold value.

The comparison unit 60 compares the to-be-verified feature information obtained by the to-be-verified feature information obtaining unit 20 with the above one or more pieces of registered feature information selected by the registered feature information narrowing unit 50. The comparison unit 60 calculates the similarity of each combination, and then outputs a piece of registered feature information with the highest similarity as a verification result. That is, the comparison unit 60 specifies a piece of registered feature information with the highest similarity to the object to-be-verified feature information as the registered feature information that belongs to the object user who is to be verified.

As is described above, in the biometric information verifying apparatus 1A, the fingerprint sensor 10, to-be-verified sub-feature information obtaining unit 30, to-be-verified sub-feature information assessing unit 40, and registered feature information narrowing unit 50 form a biometric feature information narrowing apparatus of the first embodiment. When biometric user verification is performed, the apparatus narrows down the registered feature information that is to be subjected to biometric information comparison. The function of such a biometric feature information narrowing apparatus is realized by the CPU 3 by executing a biometric feature information narrowing program embedded in the foregoing verification program.

Figure 7:
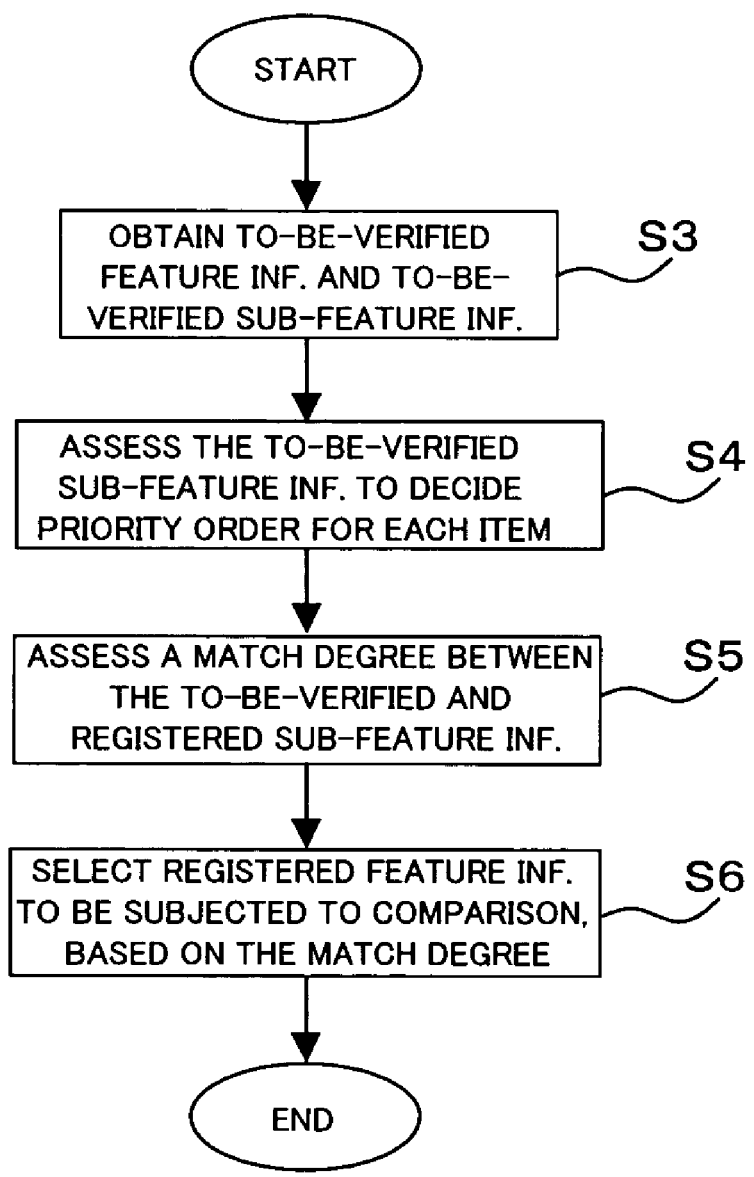
FIG. 7 is a flowchart indicating basic procedures for narrowing registered feature information according to the first embodiment.
Figure 8:
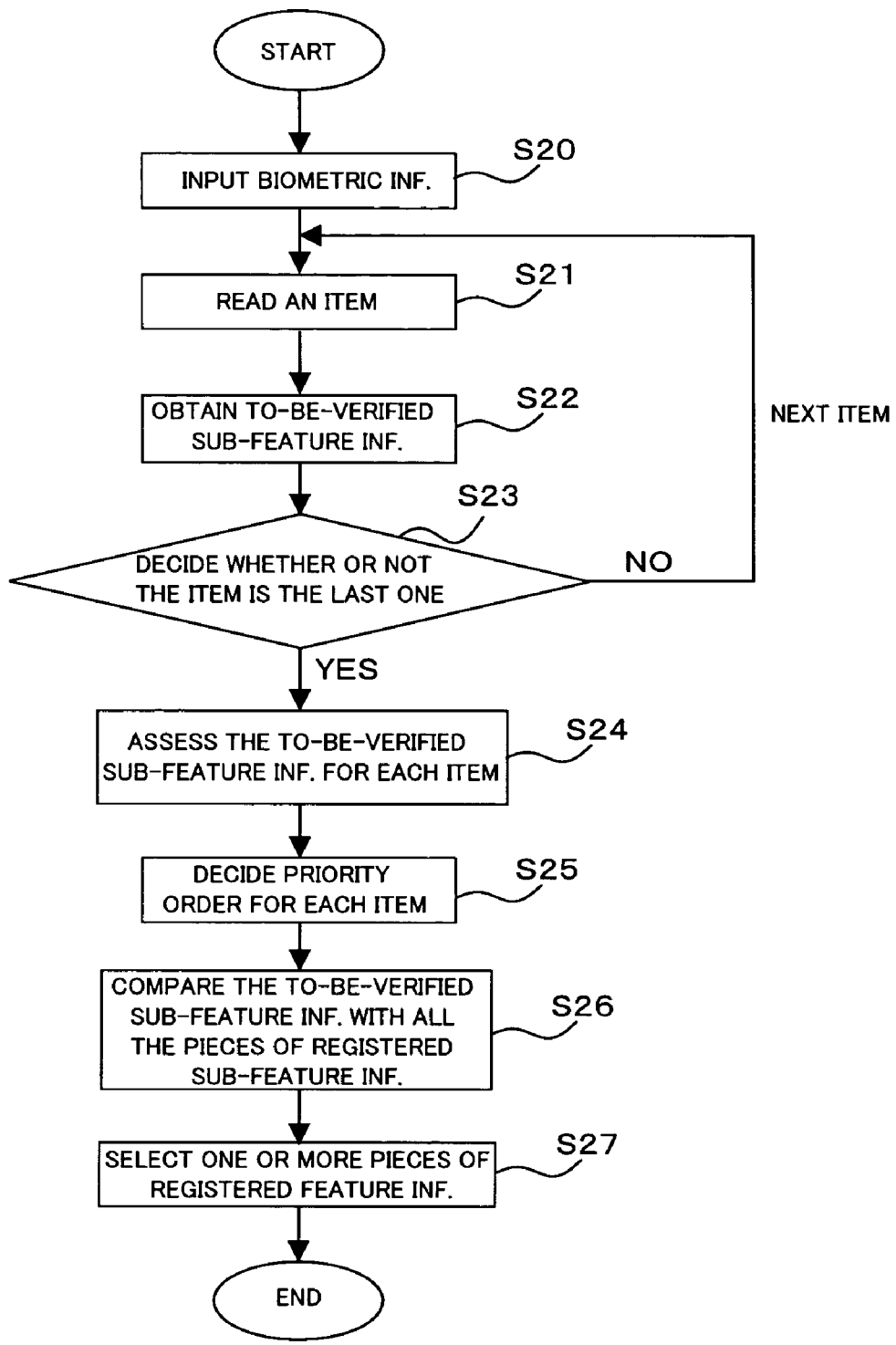
FIG. 8 is a flowchart indicating procedures for narrowing registered feature information according to the first embodiment.

Here, referring to FIG. 7 and FIG. 8, a description will be made of an operation of the biometric information verifying apparatus 1A of the first embodiment. FIG. 7 is a flowchart indicating a basic operation (basic procedures for narrowing registered feature information) of the biometric information verifying apparatus 1A; FIG. 8 is a flowchart detailing more of the operation (basic procedures for narrowing registered feature information) of the biometric information verifying apparatus 1A.

Referring to the flowchart (steps S3 through S6) of FIG. 7, the basic operation of the biometric information verifying apparatus 1A will be described hereinbelow. At the time of user verification, the to-be-verified feature information obtaining unit 20 and the to-be-verified sub-feature information obtaining unit 30 obtain to-be-verified feature information and to-be-verified sub-feature information of more than one item, respectively (step S3). On the basis of the different items of to-be-verified sub-feature information, the to-be-verified sub-feature information assessing unit 40 assesses the acquisition stability of the items of to-be-verified sub-feature information. As already described, on the basis of the assessment result, the priority order of each sub-feature information item is determined. In consequence, the sub-feature information comparing unit 51 decides weights to be assigned to the comparison result obtained for each item of the sub-feature information (step S4).

The sub-feature information comparing unit 51 compares the different items of to-be-verified sub-feature information with a set of different items of registered sub-feature information pieces associated with each piece of registered feature information. The match degree calculating unit 52 assigns the weights, which are determined by the match degree calculating unit 52 at step S4, to the comparison result values, and then calculates a sum of the weighted comparison result values as a match degree. After that, such a match degree obtained for each set of different items of registered sub-feature information pieces (that is, each piece of registered feature information) is assessed by the registered feature information selecting unit 53 (step S5). The registered feature information selecting unit 53 then selects registered feature information associated with sets of registered sub-feature information high in match degree with to-be-verified sub-feature information, of the registered feature information previously stored in the data storage unit 4, thereby narrowing the registered feature information to be compared with the object to-be-verified feature information (step S6).

Referring to the flow chart (steps S20 through S27) of FIG. 8, a description will now be made in detail of an operation of the biometric information verifying apparatus 1A. Note that FIG. 8 omits the description of acquisition of to-be-verified feature information.

When to-be-verified biometric information (fingerprint image) is input through the fingerprint sensor 10 at user verification (step S20), the to-be-verified feature information obtaining unit 20 extracts and obtains to-be-verified feature information from the input to-be-verified biometric information, and the to-be-verified sub-feature information obtaining unit 30 (obtaining unit 31, 32, . . . ) obtains more than one item of to-be-verified sub-feature information from the input to-be-verified biometric information (steps S21 through S23).

At this time, similar to steps S12 through S14 of FIG. 6, sub-feature information items to be obtained are read out one by one (step S21). The to-be-verified sub-feature information obtaining unit 30 (corresponding units of obtaining units 31, 32, . . . ) obtains to-be-verified sub-feature information of the read-out items (step S22).

After that, it is evaluated whether or not the present item, which is the current object of the sub-feature information acquisition, is the last one, that is, whether or not all the items of to-be-registered sub-feature information are obtained (step S23). If the evaluation result is negative (NO route of step S23), the process returns to step S21, whereas if the evaluation result is positive (YES route of step S23), the to-be-verified sub-feature information assessing unit 40 assesses whether or not the to-be-verified sub-feature information of the object item can be stably used in selecting registered feature information, as the acquisition stability of individual items of to-be-verified sub-feature information (step S24).

As the assessment result, if the acquisition stability is assessed to be high, the priority of the to-be-verified sub-feature information item with such a high stability is raised, and a higher weight is assigned to the comparison result value of the item. Meanwhile, if the acquisition stability is assessed to be low, the priority of the to-be-verified sub-feature information item with such a low stability is lowered, and a lower weight is assigned to the comparison result value of the item (step S25).

After that, the sub-feature information comparing unit 51 compares the different items of to-be-verified sub-feature information with a set of different items of registered sub-feature information associated with each piece of registered feature information, and outputs a comparison result value for each item. The match degree calculating unit 52 assigns a weight determined at step S25 to each comparison result value, and then calculates a sum of the weighted comparison results as a match degree. In this manner, match degrees are calculated, one for each set of different items of registered sub-feature information (that is, each piece of registered feature information)(step S26).

After that, the registered feature information selecting unit 53 assesses the match degrees calculated for all the sets of registered sub-feature information pieces. The registered feature information selecting unit 53 then selects registered feature information pieces associated with sets of registered sub-feature information high in match degree with the to-be-verified sub-feature information (that is, sets of registered sub-feature information similar to the object to-be-verified sub-feature information), of the registered feature information previously stored in the data storage unit 4, thereby narrowing the registered feature information to be compared with the object to-be-verified feature information (step S27).

The comparison unit 60 compares the to-be-verified feature information obtained by the to-be-verified feature information obtaining unit 20 with the registered feature information pieces narrowed down in number by the registered feature information narrowing unit 50. The comparison unit 60 calculates the similarity of each combination, and then outputs apiece of registered feature information with the highest similarity as a verification result. That is, the comparison unit 60 performs 1-to-N verification between the object to-be-verified feature information and the narrowed-down registered feature information. A piece of registered feature information with the highest similarity to the object to-be-verified feature information, among the narrowed-down registered feature information, is resultantly identified as the registered feature information that belongs to the object user who is to be verified.

In this manner, every time a piece of to-be-verified biometric information is input, the biometric information verifying apparatus 1A finds out which of the different items of to-be-verified sub-feature information has a high acquisition stability (with a small fluctuation), to assess the acquisition stability. Greater weights (importance) are assigned to to-be-verified sub-feature information with higher acquisition stabilities, so that the comparison result values of the sub-feature information items with higher acquisition stabilities are reflected in the match degrees, which are parameters of registered feature information selection, with higher priorities.

This narrowing down of the number of registered feature information according to match degrees, makes the following possible. In 1-to-N biometric verification, every time to-be-verified biometric information is input, the fluctuation rate of the to-be-verified biometric information is reflected in a result of narrowing-down of the registered feature information, as the assessment result of the acquisition stability. As a result, it is possible to prevent the occurrence of a failure in the narrowing-down process with reliability, thereby preventing increases in verification time caused by the failure. This also provides narrowing down of the registered feature information with a higher reliability and with a higher accuracy.

[2] Second Embodiment

Figure 9:
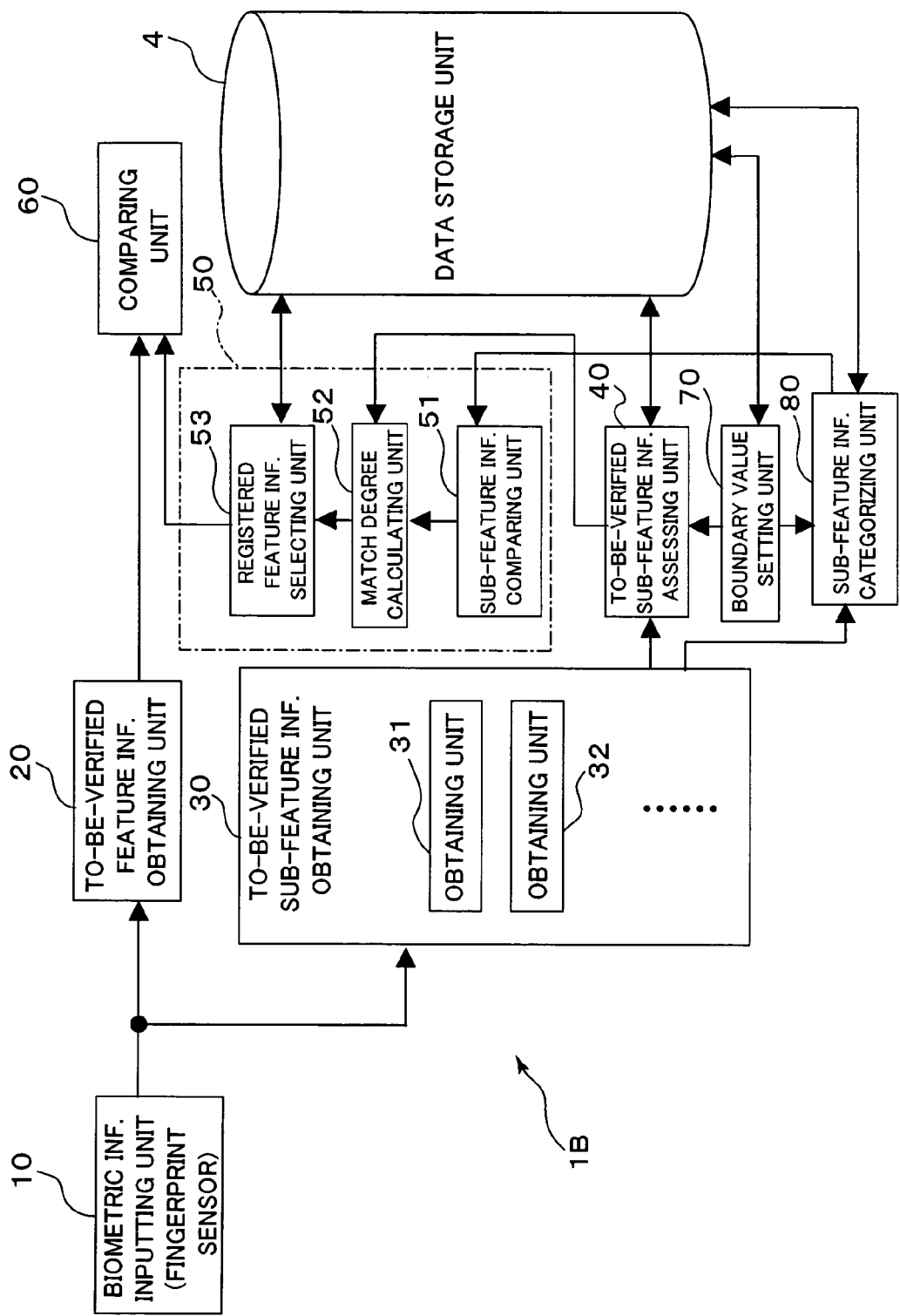
FIG. 9 is a block diagram showing a functional construction of a biometric information verifying apparatus (biometric feature information narrowing apparatus) of a second embodiment of the present invention.

FIG. 9 is a block diagram showing a functional construction of a biometric information verifying apparatus (biometric feature information narrowing apparatus) of a second embodiment of the present invention. The biometric information verifying apparatus 1B of the second embodiment of FIG. 9 also performs 1-to-N comparison (1-to-N verification) between to-be-verified feature information, which is obtained at user verification, and registered feature information stored in the data storage unit 4. The apparatus is realized by a personal computer 1 with a fingerprint sensor 10 attached thereto, and is provided with functions as a boundary value setting unit 70 and sub-feature information categorizing unit 80 as well as functions similar to those of a to-be-verified feature information obtaining unit 20, to-be-verified sub-feature information obtaining unit 30, to-be-verified sub-feature information assessing unit 40, registered feature information narrowing unit 50, and comparison unit 60, of the first embodiment. All these functions are realized by the CPU 3 by executing verification programs including a biometric feature information narrowing program. In FIG. 9, like reference numbers and characters designate similar parts or elements throughout several views of the present embodiments, so their detailed description is omitted here.

The boundary value setting unit 70 sets one or more boundary values for defining two or more categories (regions) of sub-feature information values for each item (for example, the aforementioned items A, B, and C) of sub-feature information. The boundary values set by the boundary value setting unit 70 are stored in the data storage unit 4.

The sub-feature information categorizing unit 80 categorizes, for each item of sub-feature information, the to-be-registered sub-feature information stored in the data storage unit 4 and the to-be-verified sub-feature information input through the fingerprint sensor 10, into one of the two or more categories according to the boundary values set by the boundary value setting unit 70.

The sub-feature information comparing unit 51 compares, for each item of sub-feature information, the categorization result of the to-be-verified sub-feature information obtained by the sub-feature information categorizing unit 80 with the categorization result of the registered feature information obtained by the sub-feature information categorizing unit 80. If these categorization results agree, the sub-feature information comparing unit 51 outputs a first specific value (for example, "1") as the comparison result value, whereas if the categorization results disagree, the sub-feature information comparing unit 51 outputs a second specific value (for example, "0"), the value being smaller than the first specific value.

The to-be-verified sub-feature information assessing unit 40 evaluates, for each item of sub-feature information, whether or not any boundary value is present in a specific range of values whose center value is a value of each to-be-verified sub-feature information, as the aforementioned acquisition stability. This specific range is previously set in the data storage unit 4 for each item of sub-feature information as, for example, an upper width indicating an upper range than the to-be-verified sub-feature information value and a lower width indicating a lower range than the to-be-verified sub-feature information value. At assessment of the acquisition stability, the to-be-verified sub-feature information assessing unit 40 obtains the upper width and the lower width from the data storage unit 4, and also obtains the boundary values from the data storage unit 4 and/or the boundary value setting unit 70.

Here, the upper width and the lower width may be or may not be the same value. Further, the upper width and the lower width are set, considering a range of fluctuation of the to-be-verified sub-feature information depending on its input occasions. In cases where each type of to-be-verified sub-feature information fluctuates within a normal distribution, the upper and lower widths are set, considering a standard deviation and/or a dispersion of the normal distribution. For instance, the upper and the lower width is a standard deviation, while the above specific range is a value of a to-be-verified sub-feature information value±a standard deviation.

If any boundary value is present within the specific range whose central value is the value of each to-be-verified sub-feature information, the to-be-verified sub-feature information assessing unit 40 decides that the acquisition stability is lower than where no such boundary value is present. In contrast, no boundary value is present within the range, the to-be-verified sub-feature information assessing unit 40 decides that the acquisition stability is higher than where such a boundary value is present.

As a result of assessment by the to-be-verified sub-feature information assessing unit 40, if it is decided that items of sub-feature information have higher acquisition stabilities, the match degree calculating unit 52 assigns higher weights to the comparison result values of the items. More specifically, if the categorization result of an item is unstable because of any boundary value present in the specific range, the item (with a low acquisition stability) is given a low weight (for example, 0.5). Whereas, if the categorization result is stable, the item (with a low acquisition stability) is given a higher weight (for example, 1). Here, "0" is set to the weight of the unstable item (with a low acquisition stability), and this makes it possible to exclude the item of to-be-verified sub-feature information from objects of the match degree calculation, thereby preventing the use of the item in the match degree calculation.

In the biometric information verifying apparatus 1B, the fingerprint sensor 10, to-be-verified sub-feature information obtaining unit 30, to-be-verified sub-feature information assessing unit 40, registered feature information narrowing unit 50, boundary value setting unit 70, and sub-feature information categorizing unit 80 form the biometric feature information narrowing apparatus of the second embodiment. When biometric user verification is performed, the apparatus narrows down the registered feature information that is to be subjected to biometric information comparison. The function of such a biometric feature information narrowing apparatus is realized by the CPU 3 by executing a biometric feature information narrowing program embedded in the foregoing verification program.

Figures 10, 11, 12:
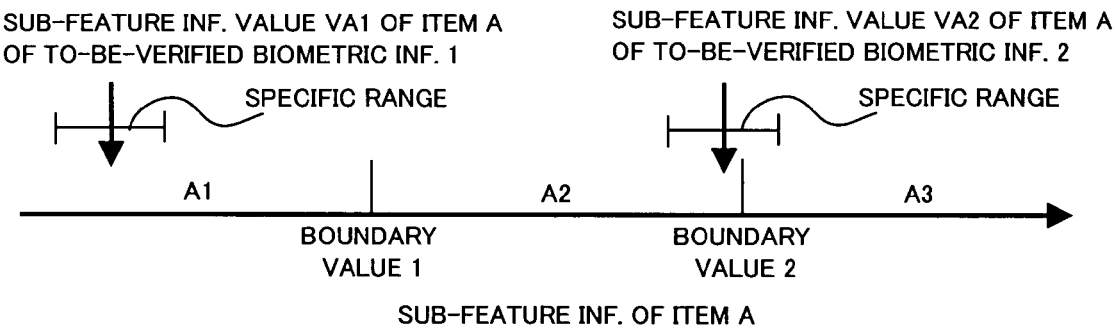
FIG. 10 is a table indicating a categorization example of sub-feature information according to the second embodiment.
FIG. 11 is a view describing a method for assessing the acquirement stability of to-be-verified sub-feature information according to the second embodiment.
FIG. 12 is a table for use in describing an example of calculation of match degrees for sub-feature information according to the second embodiment.

Here, referring to FIG. 10 through FIG. 12, a description will be made of an operation of the biometric information verifying apparatus 1B of the second embodiment. FIG. 10 is a table indicating a categorization example of sub-feature information according to the second embodiment; FIG. 11 is a view describing a method for assessing the acquirement stability of to-be-verified sub-feature information according to the second embodiment, FIG. 12 is a table for use in describing an example of calculation of match degrees for sub-feature information according to the second embodiment. Here, the operation (registered feature information narrowing procedures) of the biometric information verifying apparatus 1B is basically the same as those of the biometric information verifying apparatus 1A already described above, and the description thus will be omitted hereinbelow.

In the biometric information verifying apparatus 1B of the second embodiment, the boundary value setting unit 70 sets, for each item of sub-feature information, one or more boundary values for defining two or more categories, into which each sub-feature information value is to be categorized. In accordance with the boundary value, the sub-feature information categorizing unit 80 categorizes each item of registered sub-feature information and each item of to-be-verified sub-feature information into one of those categories.

FIG. 10 is a table indicating a categorization example of sub-feature information according to the second embodiment. FIG. 10 shows three sets of data 1, 2, and 3, each including three items A, B, and C of sub-feature information. The three items A, B, and C of sub-feature information of each data piece are categorized into one of the three categories. Here, the number of categories is 3 (the number of boundary values is 2). The sub-feature information of item A is categorized into one of categories A1, A2, and A3; the sub-feature information of item B is categorized into one of categories B1, B2, and B3; the sub-feature information of item C is categorized into one of categories C1, C2, and C3. In the example of FIG. 10, the categorization result of data 1 is (A1, B2, and C2); the categorization result of data 2 is (A2, B2, and C3); the categorization result of data 3 is (A3, B1, and C1).

The sub-feature information comparing unit 51 compares, for each item of sub-feature information, the to-be-verified sub-feature information categorization result and the registered sub-feature information categorization result. On the basis of the comparison result, the registered feature information selecting unit 53 calculates a match degree of the sub-feature information. Here, a description is given of a specific example of the match degree calculation. In this example, it is assumed that the acquisition stabilities obtained by the to-be-verified sub-feature information assessing unit 40 are equal between the individual items (the priority orders of the items are equal), and that all the comparison result values are given the same weight "1".

For instance, provided the categorization result of to-be-verified sub-feature information is (A1, B2, and C3) and also that the categorization result of registered sub-feature information is (A1, B1, C3), the categories (categorization result) of item A and item C agree, and the category (categorization result) of B disagrees. Therefore, "1" is obtained as a comparison result value of item A and item C, while "0" is obtained as a comparison result value of item B, and "2", which is the sum of the comparison result values, is obtained as a match degree. That is, the thus obtained match degree is equal to the number of the items which are the same in category (categorization result).

Next, a detailed description will be made hereinbelow of a case where the assessment result (whether or not any boundary value is present in a specific range whose center value is the value of each to-be-verified sub-feature information) obtained by the to-be-verified sub-feature information assessing unit 40 for each item is used as the acquisition stability, and the assessment result is reflected on the match degree calculation.

In cases where any boundary value is present in a specific range of values whose center is a value of to-be-verified sub-feature information, it is highly possible that the to-be-verified sub-feature information is categorized in different categories at different input occasions. Taking the example of sub-feature information value VA1, in FIG. 11, of item A obtained from to-be-verified biometric information 1 which belongs to a user who is to be verified, since there is no boundary value present in a specific range whose center is the sub-feature information value VA1, the possibility that the categorization result varies is low, even considering the fluctuation among input occasions.

In contrast to this, as for sub-feature information value VA2, which is obtained from to-be-verified biometric information of another user, boundary value 2 is present within a specific region whose center is a value of VA2. Therefore, it is highly possible that the categorization result of sub-feature information item A of the to-be-verified information 2 varies every time information input is performed. As a result, sub-feature information item A of the to-be-verified biometric information 1 should be reflected on the match degree calculation, whereas sub-feature information item A of the to-be-verified biometric information 2 should not be reflected thereon.

Hence, the to-be-verified sub-feature information assessing unit 40 of the second embodiment evaluates, for each item of sub-feature information, whether or not any boundary value is present in a specific range whose center is the value of each to-be-verified sub-feature information, as the aforementioned acquisition stability. If a boundary is present in the specific range of any item of to-be-verified sub-feature information, the to-be-verified sub-feature information assessing unit 40 decides that the item (with a low acquisition stability) is unstable in categorization result. The to-be-verified sub-feature information assessing unit 40 then excludes the to-be-verified sub-feature information (comparison result value) of the item from objects of match degree calculation with registered sub-feature information, or assigns a low weight to the comparison result of the item.

In the latter case, as is already described, items with unstable comparison results are given lower weight, whereas items with stable comparison results are given higher weight. For example, a weight of "0.5" is assigned to an item with an unstable categorization result, whereas a weight of "1.0" is assigned to an item with a stable categorization result. That is, the stable item is given a higher priority than the unstable item.

Here, a concrete example of match degree calculation using such weights is shown in FIG. 12. In FIG. 12, the to-be-verified sub-feature information categorization result is (A1, B2, and C3),while the registered sub-feature information categorization result is (A1, B1, C3). The categories (categorization results) of item A and item C agree, whereas the category (categorization result) of item B disagrees. Accordingly, "1" is obtained as a comparison result value of item A and item C, while "0" is obtained as a comparison result value of item B.

The items A, B, and C are given weights $W_A$, $W_B$, and $W_C$, respectively, and a match degree is calculated as follows: $1 \cdot W_A + 0 \cdot W_B + 1 \cdot W_C = W_A + W_C$. Here, it is assumed that item A is stable in categorization result (high in acquisition stability and a weight $W_A$ of 1.0 is assigned to item A, and it is also assumed that item C is unstable in categorization result (low in acquisition stability) and a weight $W_C$ of 0.5 is given to item B. The match degree in this case is $W_A + W_C = 1.0 + 0.5 = 1.5$, and the weights (priority order) assigned to the individual items are reflected on the match degree calculation. That is, the sub-feature information comparison result value of item A whose categorization result is stable is reflected on the match degree, which is a parameter in registered feature information selection, with a higher priority than item C whose categorization result is unstable.

In this manner, in the biometric information verifying apparatus 1B of the second embodiment, it is evaluated whether or not any boundary value for categorization is present in a specific range, whose center is a value of to-be-verified sub-feature information value sandwiched between the upper width and the lower width. Depending upon the evaluation result, the use or non-use of each item in the match degree calculation is decided, or a weight is assigned to each item for use in the match degree calculation. This makes it possible to suppress the effect caused by to-be-verified sub-feature information items whose categorization result is unstable because of their values close to the boundary values for categorization, so that fluctuation of a match degree calculated by the match degree calculating unit 52 is reduced, thereby realizing similar effects and benefits to those of the first embodiment.

[3] Third Embodiment

Figure 13:
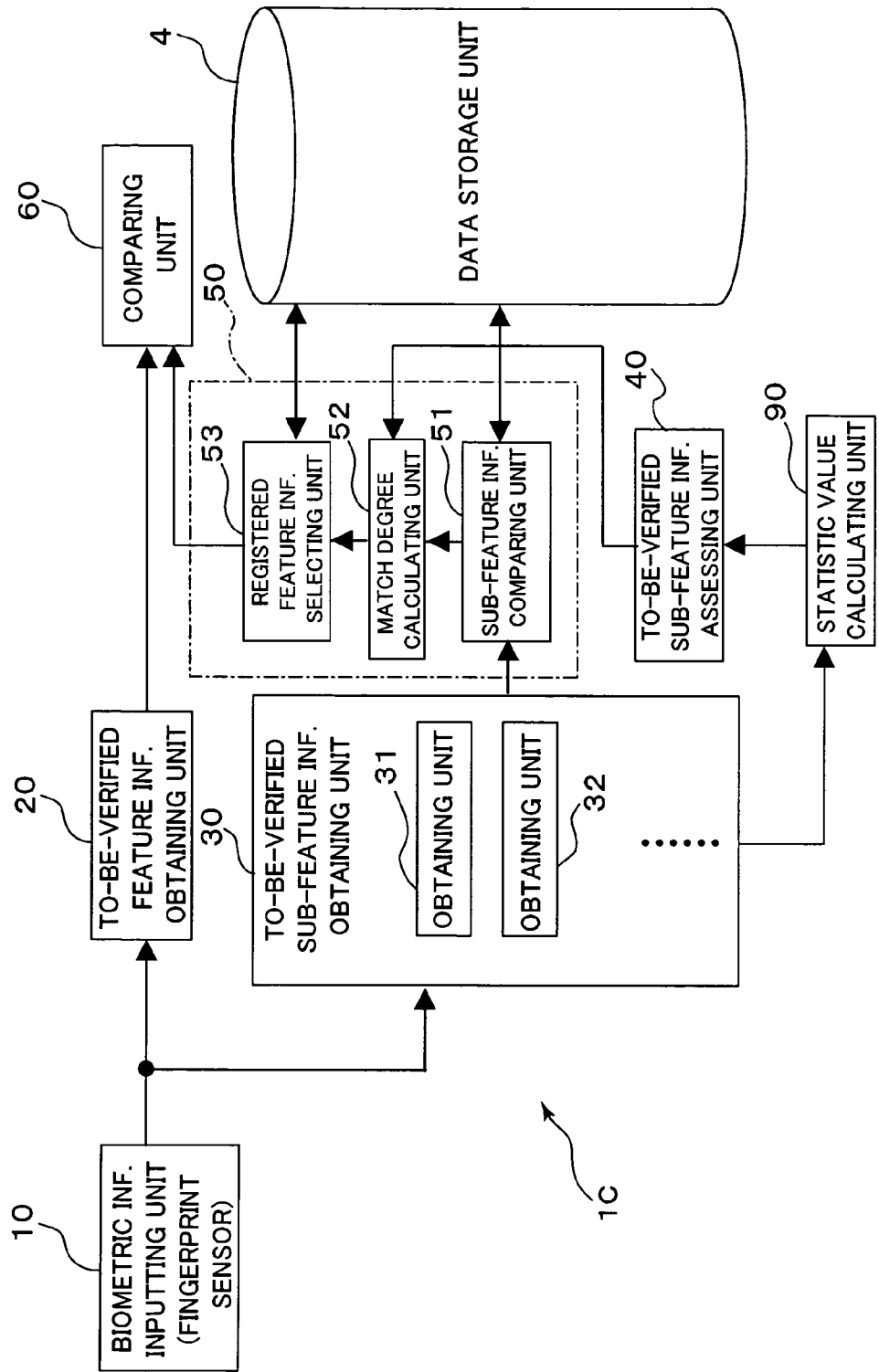
FIG. 13 is a block diagram showing a functional construction of a biometric information verifying apparatus (biometric feature information narrowing apparatus) of a third embodiment of the present invention.

FIG. 13 is a block diagram showing a functional construction of a biometric information verifying apparatus (biometric feature information narrowing apparatus) of a third embodiment of the present invention. The biometric information verifying apparatus 1C of the second embodiment of FIG. 13 also performs 1-to-N comparison between to-be-verified feature information, which is obtained at user verification, and registered feature information stored in the data storage unit 4. The apparatus is realized by a personal computer 1 with a fingerprint sensor 10 attached thereto, and is provided with a function as a statistical value calculating unit 90 as well as functions similar to those of a to-be-verified feature information obtaining unit 20, to-be-verified sub-feature information obtaining unit 30, to-be-verified sub-feature information assessing unit 40, registered feature information narrowing unit 50, and comparison unit 60, of the first embodiment. All these functions are realized by the CPU 3 by executing verification programs including a biometric feature information narrowing program. In FIG. 13, like reference numbers and characters designate similar parts or elements throughout several views of the present embodiments, so their detailed description is omitted here.

In the biometric information verifying apparatus 1C, to-be-verified biometric information (fingerprint images) of the same body part (for example, the fingertip of the index finger of the right hand) is input through the fingerprint sensor 10 more than one time, at user verification. At that time, the user can place his finger on the fingerprint sensor 10 every time the fingerprint is sampled, or alternatively, he can hold his finger on the sensor 10 while his fingerprint is sampled several times.

The to-be-verified sub-feature information obtaining unit 30 (obtaining units 31, 32, . . . ) of the third embodiment extracts and obtains more than one item (items A, B, and C) of to-be-verified sub-feature information from the two or more pieces of to-be-verified biometric information input through the fingerprint sensor 10.

The statistical value calculating unit 90 newly employed in the third embodiment calculates a statistical value of the to-be-verified sub-feature information, based on the two or more pieces of to-be-verified sub-feature information obtained from the same body part by the to-be-verified sub-feature information obtaining unit 30. The statistical value is, for example, a dispersion, a standard deviation, and a difference between the maximum and the minimum value, which indicates the variation of the to-be-verified sub-feature information. When the dispersion, the standard deviation, the difference between the maximum value and the minimum value are greater, the variation in to-be-verified sub-feature information value among input occasions is greater. Such statistical values are used, in the third embodiment, as parameters of the acquisition stability of every item of sub-feature information.

The to-be-verified sub-feature information assessing unit 40 assesses, for each item of sub-feature information, the acquisition stability based on the statistical values obtained by the statistical value calculating unit 90.

More specifically, the acquisition stability assessment is carried out with the following methods (1) and (2).

(1) For each item of sub-feature information, specific threshold values against the statistical values are previously determined. At the time of verification, the to-be-verified sub-feature information assessing unit 40 obtains the threshold values from the data storage unit 4, and the statistical value calculating unit 90 compares, for each item, statistical values calculated by the statistical value calculating unit 90 with the threshold values, to evaluate whether or not the statistical values exceed the threshold values, as the acquisition stability. After that, the match degree calculating unit 52 decides whether or not each item of the to-be-verified sub-feature information is to be used in match degree calculation, based on the comparison result between the statistical values and the threshold values. That is, if a statistical value exceeds (or is equal to or greater than) its threshold value, the to-be-verified sub-feature information assessing unit 40 decides that the item has a lower acquisition stability than an item having a statistical value lower (or equal to or lower) than the threshold value. The to-be-verified sub-feature information of the former item is then excluded from objects of calculation that are performed by the match degree calculating unit 52, so that the item is not used in the match degree calculation.

(2) As will be detailed with reference to FIG. 15, the data storage unit 4 previously stores, for each item of sub-feature information, one or more boundary values for defining two or more categories (regions) for the statistical values of the to-be-verified sub-feature information. At the time of verification, the to-be-verified sub-feature information assessing unit 40 obtains the one or more boundary values from the data storage unit 4, and categorizes, for each item, a statistical value into one of the two or more categories (regions) whose boundary is the above boundary values, and the acquisition stability is assessed according to the category into which the statistical value is categorized. That is, an item whose statistical value is categorized in a larger statistical value category is assessed to be lower in acquisition stability, and the match degree calculating unit 52 gives a lower weight to the item. In contrast to this, an item whose statistical value is categorized in a smaller statistical value category is assessed to be higher in acquisition stability, and the match degree calculating unit 52 gives a higher weight to the item. At this time, one boundary value defines two categories, and a weight of "0" is given to the item belonging to the smaller statistical value region (category). This makes it possible to exclude the item from objects of match degree calculation, so that the item is not used in the match degree calculation.

In the biometric information verifying apparatus 1C, the biometric feature information narrowing apparatus of the third embodiment is realized by a personal computer 1 with a fingerprint sensor 10 attached thereto, and is formed by a to-be-verified sub-feature information obtaining unit 30, to-be-verified sub-feature information assessing unit 40, registered feature information narrowing unit 50, and a statistical value calculating unit 90. The biometric feature information narrowing apparatus also narrows down registered feature information that is to be subjected to biometric information comparison. The function of such a biometric feature information narrowing apparatus is realized by the CPU 3 by executing a biometric feature information narrowing program embedded in the foregoing verification program.

Figure 14:
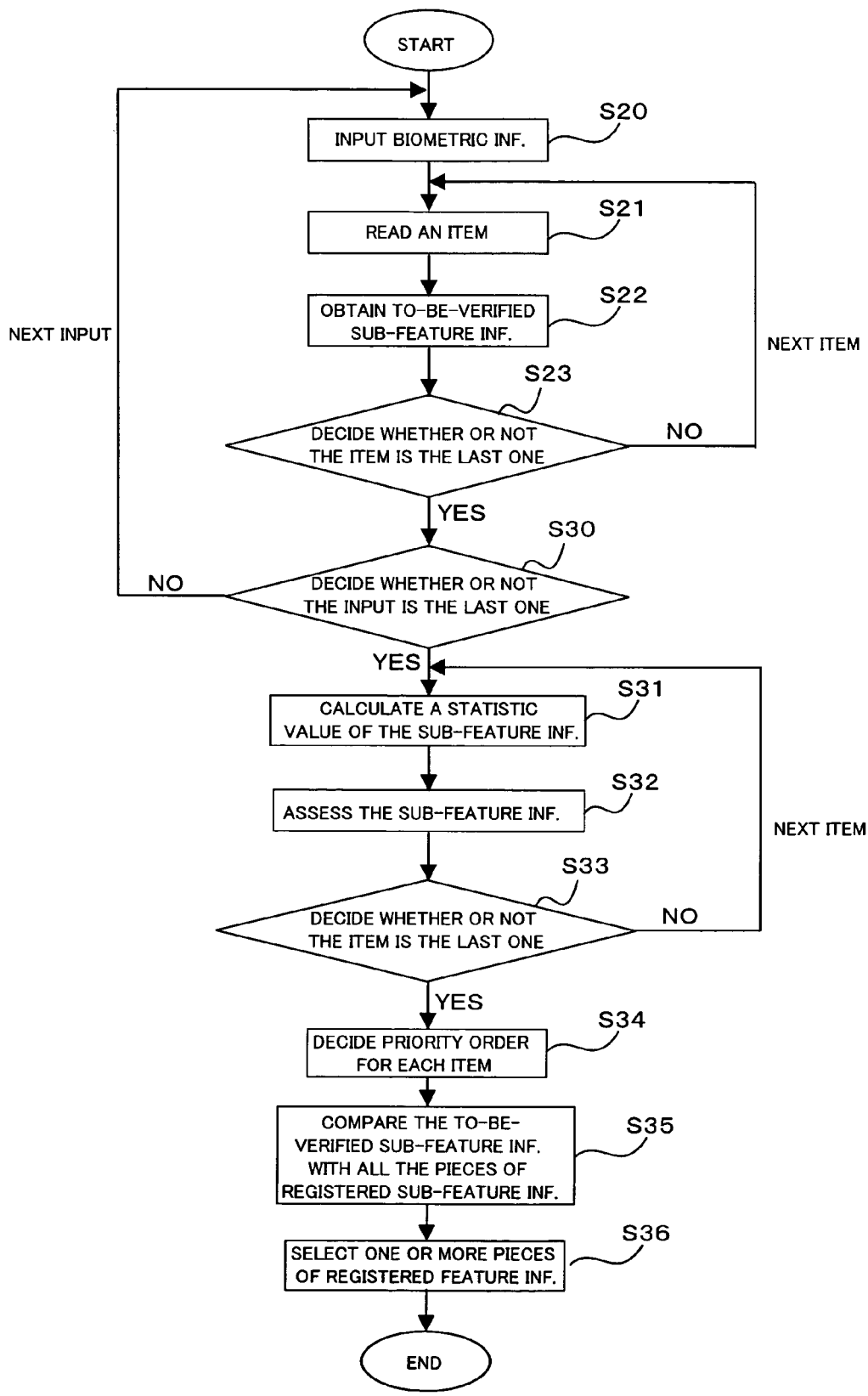
FIG. 14 is a flowchart indicating procedures for narrowing registered feature information according to the third embodiment.

Referring to the flow chart (steps S20 through S23. and steps S30 through S36) of FIG. 14 and FIG. 15, a basic operation of the biometric information verifying apparatus 1C will be described hereinbelow. FIG. 15 is a view indicating a categorization example of statistical values according to the third embodiment. In FIG. 14, also, the description of acquisition of to-be-verified feature information will be omitted.

As is already described, to-be-verified biometric information (fingerprint images) of the same fingertip is input through the fingerprint sensor 10 more than one time at user verification. After the to-be-verified biometric information is input through the fingerprint sensor 10 (step S20), the items of sub-feature information to be obtained are read out one by one (step S21), as in the case of step S12 through step S14 of FIG. 6, and to-be-verified sub-feature information of the read-out item is then obtained by the to-be-verified sub-feature information obtaining unit 30 (step S22).

After that, it is evaluated whether or not the present item, which is the current object of the sub-feature information acquisition, is the last one, that is, whether or not all the items of to-be-registered sub-feature information are obtained (step S23). If the evaluation result is negative (NO route of step S23), the process returns to step S21, whereas if the evaluation result is positive (YES route of step S23), it is then evaluated whether or not the current to-be-verified biometric information is the last piece (input)(step S30). If the evaluation result is negative (NO route of step S30), the process returns to step S20, and to-be-verified sub-feature information is obtained from the next to-be-verified biometric information piece.

On the other hand, if the evaluation result is positive (YES route of step S30), on the basis of the sets of to-be-verified sub-feature information obtained by procedures of steps S20 through S23 and step S30, the statistical value calculating unit 90 calculates, for each item of sub-feature information, statistical values (for example, a dispersion, a standard deviation, and a difference between the maximum and the minimum value) (step S31), and the to-be-verified sub-feature information assessing unit 40 assesses, for each item, the acquisition stability based on the statistical values obtained by the statistical value calculating unit 90 (step S32). These procedures of step S31 and step S32 are repeated until it is decided (YES decision of step S33) that the procedures have been completed for all the items.

After that, depending upon the assessment result for each item, the use or non-use of each item in the match degree calculation is determined as a priority order by the aforementioned method (1), or weights of items in the match degree calculation are set as the priority order, by the aforementioned method (2)(step S34). The sub-feature information comparing unit 51 obtains all the registered sub-feature information stored in the data storage unit 4, and compares the different items of to-be-verified sub-feature information with a set of different items of registered sub-feature information associated with each piece of registered feature information, and then outputs the comparison result for each item. Further, the match degree calculating unit 52 calculates a match degree for each set of registered sub-feature information pieces (that is, for each piece of registered feature information), based on the use/non-use information or weights decided by step S34 (step S35).

Here, the to-be-verified sub-feature information of each item for use in comparison by the sub-feature information comparing unit 51 is an arbitrary one of the pieces of to-be-verified sub-feature information that are obtained for each item two or more times at steps S20 through S23 and step S30, or a mean or median value of the to-be-verified sub-feature information as will be described later in the sixth embodiment.

After that, like step S27 of FIG. 8, the registered feature information selecting unit 53 assesses the match degrees calculated for all the sets of to-be-verified sub-feature information. The registered feature information selecting unit 53 selects registered feature information pieces associated with sets of registered sub-feature information (that is, sets of registered sub-feature information that are similar to the to-be-verified sub-feature information) high in degree of matching with the to-be-verified sub-feature information, from the registered feature information previously registered in the data storage unit 4, so that registered feature information pieces to be subjected to comparison with the to-be-verified feature information are narrowed down (step S36).

Here, on one hand, if the method (1) is employed, specific threshold values set for the individual items are obtained from the data storage unit 4. The threshold values of the items are compared with the to-be-verified sub-feature information statistical values of the items. If the statistical value of one item exceeds (or is equal to or greater than) its specific threshold, the item will not be used in sub-feature information comparison (that is, match degree calculation).

On the other hand, if the method (2) is employed, one or more boundary values, set for each item, are obtained from the data storage unit 4, and the statistical value of each item is categorized into one of the two or more categories (regions) whose boundaries are the above boundary values. FIG. 15 shows an example of the categorization.

Figure 15:
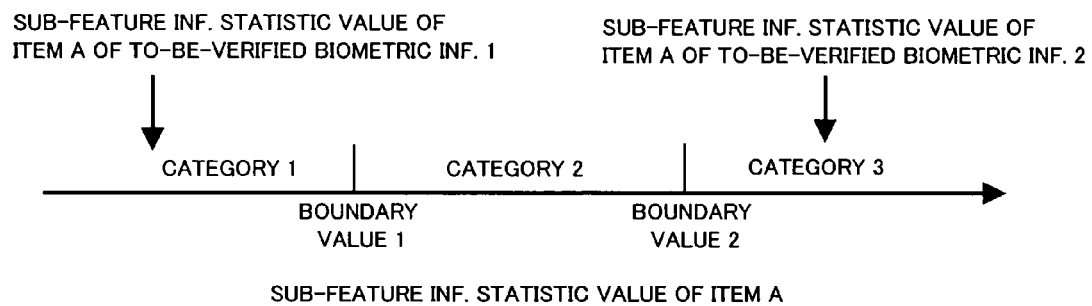
FIG. 15 is a view indicating a categorization example of statistical values according to the third embodiment.

In FIG. 15, each of the two statistical values is categorized into one of the three categories (regions) 1, 2, and 3 whose boundaries are boundary values 1 and 2. The static value of item A obtained from to-be-verified biometric information 1 belonging to one user is categorized into category 1, whereas the statistical value of item A obtained from to-be-verified biometric information 2 belonging to another user is categorized into category 3. In FIG. 15, the more the value goes to the right side, the greater the statistical value (the amount indicating variation in to-be-verified sub-feature information), whereas the more the value goes to the right side, the smaller the statistical value.

That is, if the statistical value of item A is categorized in category 3 (the statistical value is large), a low weight (see $W_A$ of FIG. 12) is given to item A, so as to lower its priority order. Whereas, if the statistical value of item A is categorized in category 1 (the statistical value is small), a higher weight (see $W_A$ of FIG. 12) is given to item A, so as to raise its priority order. In this manner, weights (priority orders) are assigned to the individual items, depending upon the amounts of the statistical values, which indicate variation among the to-be-verified sub-feature information pieces.

As described above, with the aforementioned method (1), it is possible not to perform comparison or match degree calculation of to-be-verified sub-feature information items which have large statistical values and which vary among input occasions, so that variation in data selection can be reduced. In addition, with the aforementioned method (2), it is possible to assign lower weights to items grouped in larger statistical value categories, so that fluctuation of match degree calculation can be reduced. That is, it is possible to suppress the effect of unstable items, whose states vary depending upon input occasions, on the match degree calculation to a minimum. Therefore, it is possible to reduce variations in match degree calculated by the match degree calculating unit 52, so that like effects to those of the first embodiment are successfully realized in the third embodiment.

[4] Fourth Embodiment

Figure 16:
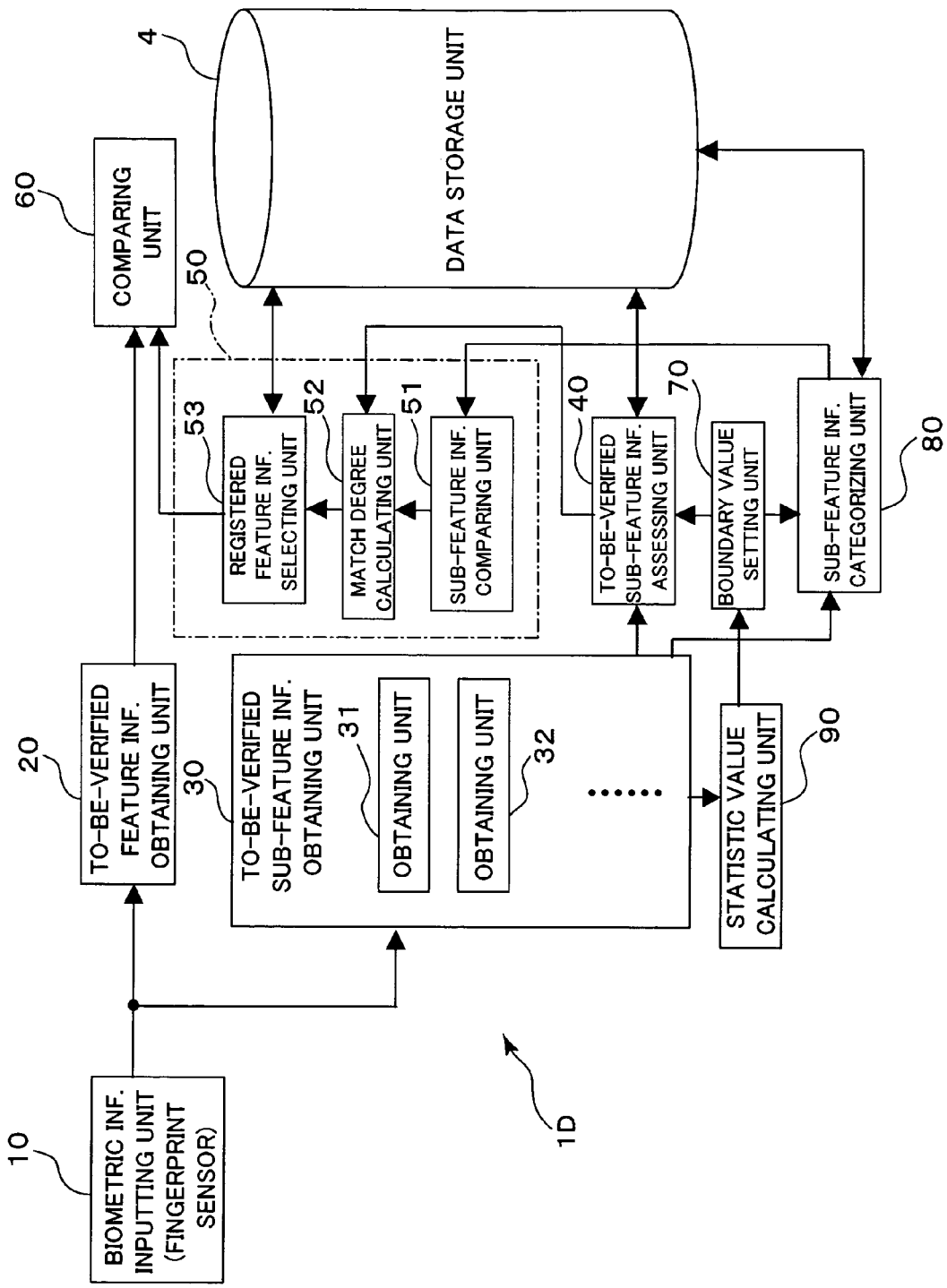
FIG. 16 is a block diagram showing a functional construction of a biometric information verifying apparatus (biometric feature information narrowing apparatus) of a fourth embodiment of the present invention.

FIG. 16 is a block diagram showing a functional construction of a biometric information verifying apparatus (biometric feature information narrowing apparatus) of a fourth embodiment of the present invention. The biometric information verifying apparatus 1D of the fourth embodiment of FIG. 16 also performs 1-to-N comparison (1-to-N verification) between to-be-verified feature information, which is obtained at user verification, and registered feature information stored in the data storage unit 4. The apparatus is realized by a personal computer 1 with a fingerprint sensor 10 attached thereto, and is provided with a function as a statistical value calculating unit 90 as well as functions as a to-be-verified feature information obtaining unit 20, to-be-verified sub-feature information obtaining unit 30, to-be-verified sub-feature information assessing unit 40, registered feature information narrowing unit 50, and comparison unit 60 as a boundary value setting unit 70 and sub-feature information categorizing unit 80, of the second embodiment. All these functions are realized by the CPU 3 by executing verification programs including a biometric feature information narrowing program. In FIG. 16, like reference numbers and characters designate similar parts or elements throughout several views of the present embodiments, so their detailed description is omitted here.

In the biometric information verifying apparatus ID, also, to-be-verified biometric information (fingerprint images) of the same body part is input through the fingerprint sensor 10 more than one time at user verification. The to-be-verified sub-feature information obtaining unit 30 of the fourth embodiment extracts and obtains more than one item of to-be-verified sub-feature information from the two or more pieces of to-be-verified biometric information input through the fingerprint sensor 10.

As in the case of the third embodiment, the statistical value calculating unit 90 calculates statistical values of the to-be-verified sub-feature information, that is, statistical values, such as a dispersion, a standard deviation, and a difference between the maximum and the minimum value, which indicate variations in the to-be-verified sub-feature information, based on the two or more pieces of to-be-verified sub-feature information obtained from the same body part by the to-be-verified sub-feature information obtaining unit 30.

As will be detailed later with reference to FIG. 17 and FIG. 18, the boundary value setting unit 70 sets/changes, for each item of sub-feature information, the number of boundary values and/or distances between the boundary values, which are for defining two or more categories (regions) for each sub-feature information value, based on statistical values calculated by the statistical value calculating unit 90. The boundary values, which have been changed by the boundary value setting unit 70, are stored in the storage device 4.

Here, the boundary value setting unit 70 decides, for each item, the number of boundary values of the sub-feature information and/or the distances between the boundary values, according to the amount of the above statistical values. At that time, if the statistical values are large, the number of boundary values is decreased, or the distance between the boundary values is enlarged. On the other hand, if the statistical values are small, the number of boundary values is increased, or the distance between the boundary values is reduced, so that the possibility of a failure in categorizing the sub-feature information is lowered.

Figure 17:
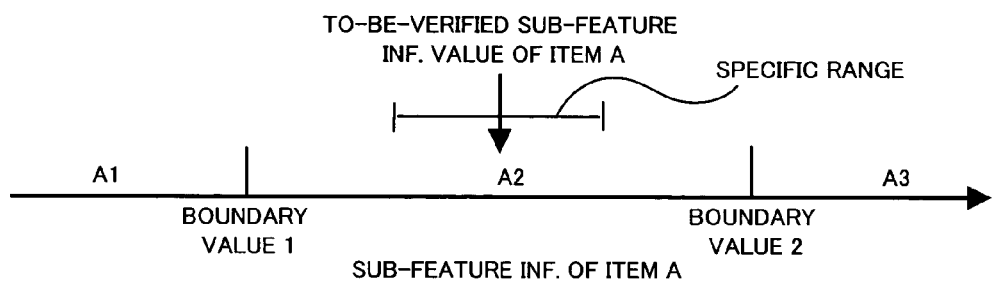
FIG. 17 is a view showing an example where boundary values have been changed by a boundary value setting unit of the forth embodiment.
Figure 18:
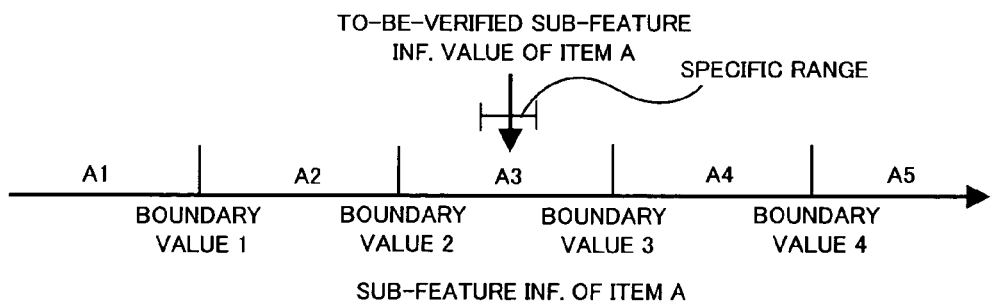
FIG. 18 is a view showing another example where the boundary values have been changed by a boundary value setting unit of the forth embodiment.

Each of FIG. 17 and FIG. 18 is a view showing an example where boundary values have been changed by the boundary value setting unit 70 of the forth embodiment. In cases where the statistical values are large, the distances between the boundary values are increased, as shown in FIG. 17, and the number of boundary values set becomes "2". In the example of FIG. 17, the sub-feature information is categorized into three categories A1, A2, and A3, according to boundary values 1 and 2. On the other hand, in cases where the statistical values are small, the distance between the boundary values is reduced, as shown in FIG. 18, and the number of boundary values set becomes "4". In the example of FIG. 18, the sub-feature information is categorized into five categories A1, A2, A3, A4, and A5, according to boundary values 1, 2, 3 and 4.

Here, with changes in the number of boundary values set and in the distances between the values, the specific region (upper width and lower width) whose center is the value of each item of to-be-verified sub-feature information is also changed. For instance, as shown in FIG. 17, provided that the distances between the boundary values are increased and the number of the boundary values set is decreased, the width of the specific range is increased. On the other hand, as shown in FIG. 18, provided that the distances between the boundary values are decreased and the number of the boundary values set is increased, the width of the specific range is decreased.

In the biometric information verifying apparatus 1D, the fingerprint sensor 10, to-be-verified sub-feature information obtaining unit 30, to-be-verified sub-feature information assessing unit 40, registered feature information narrowing unit 50, boundary value setting unit 70, sub-feature information categorizing unit 80, and statistical value calculating unit 90, form the biometric feature information narrowing apparatus of the fourth embodiment. When biometric user verification is performed, the apparatus narrows down the registered feature information that is to be subjected to biometric information comparison. The function of such a biometric feature information narrowing apparatus is realized by the CPU 3 by executing a biometric feature information narrowing program embedded in the foregoing verification program.

Referring to the flow chart (steps S20 through S27 and steps S40 through S43) of FIG. 19, a description will now be made in more detail of an operation (registered feature information narrowing procedures) of the biometric information verifying apparatus 1D. Note that FIG. 19 omits the description of acquisition of to-be-verified feature information.

Figure 19:
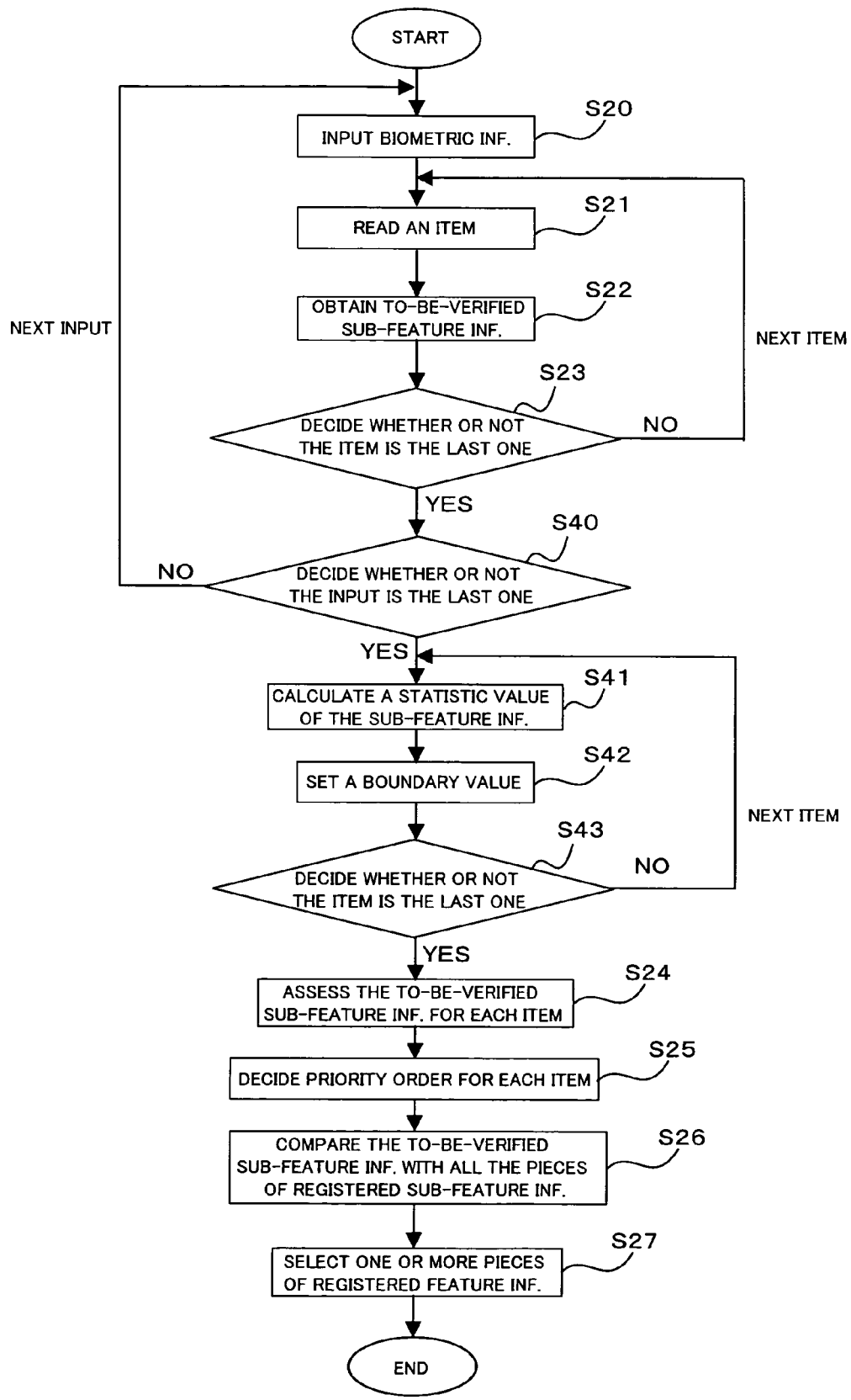
FIG. 19 is a flowchart indicating procedures for narrowing registered feature information according to the fourth embodiment.

The procedures shown in FIG. 19 are a combination of to-be-verified feature information narrowing procedures (steps S20 through S27) and new steps S40 through S43.

As already described, to-be-verified biometric information of the same fingertip is input through the fingerprint sensor 10 more than one time at user verification, and to-be-verified sub-feature information of the different items is then obtained by the to-be-verified sub-feature information obtaining unit 30 (steps S20 through S23 and step S40). Since the procedures of steps S20 through S23 and step S40 are similar to the procedures of steps S20 through S23 and step S30 of FIG. 14, detailed description is omitted here. Further, since the procedures of steps S24 through S27 of FIG. 19 are similar to the procedures of steps S24 through S27 of FIG. 8, detailed description is omitted here.

If to-be-verified sub-feature information is obtained from all the pieces of to-be-verified biometric feature information (YES decision at step S40), the statistical value calculating unit 90 calculates, for each item, statistical values (for example, a dispersion, a standard deviation, and a difference between the maximum and the minimum value) of the to-be-verified sub-feature information, based on the sets of to-be-verified sub-feature information obtained by steps S20 through S23 and step S30 (step S41). The boundary value setting unit 70 then changes the number of boundary values and the distances between the values according to the statistical values obtained by the statistical value calculating unit 90 (step S42). These procedures of step S41 and step S42 are repeated until it is decided (YES decision of step S43) that the procedures have been completed for all the items. After such setting/changing of the number of boundary values and the distances between the values for each item, the narrowing down of registered feature information is carried out in the similar manner to the second embodiment.

In this manner, according to the biometric information verifying apparatus 1D of the fourth embodiment, if the statistical values are large, the number of boundary values is reduced, or the distances between the values are increased. Whereas, if the statistical values are small, the number of boundary values is increased, or the distances between the values are increased. This will reduce variation in categorization results obtained by the sub-feature information categorizing unit 80, and the possibility of a failure in categorizing the sub-feature information is lowered. It is also possible to reduce variations in degree of matching calculated by the match degree calculating unit 52, so that like effects to those of the first embodiment are successfully realized in the fourth embodiment.

[5] Fifth Embodiment

Figure 20:
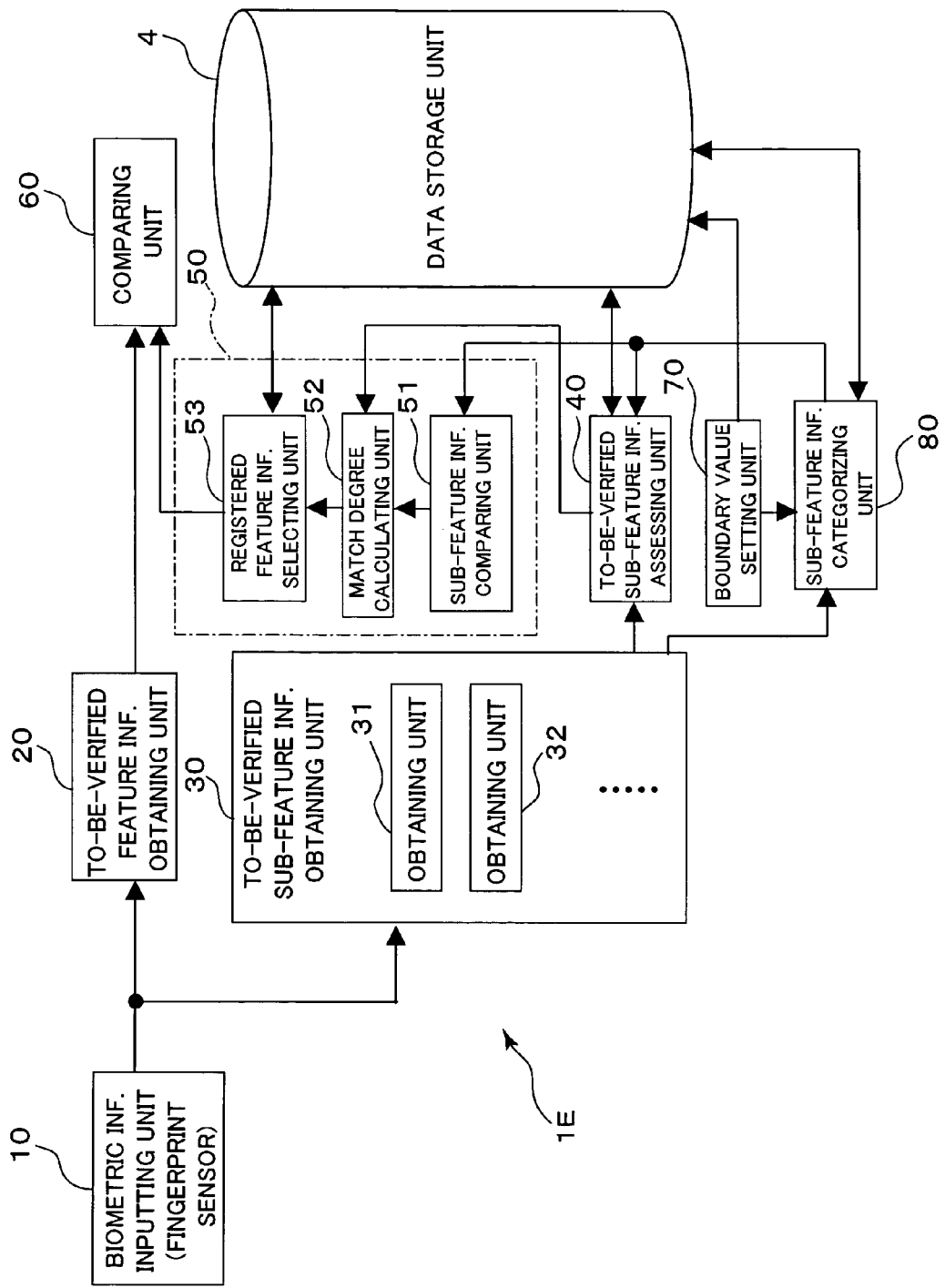
FIG. 20 is a block diagram showing a functional construction of a biometric information verifying apparatus (biometric feature information narrowing apparatus) of a fifth embodiment of the present invention.

FIG. 20 is a block diagram showing a functional construction of a biometric information verifying apparatus (biometric feature information narrowing apparatus) of a fifth embodiment of the present invention. The biometric information verifying apparatus 1E of the fifth embodiment of FIG. 20 also performs 1-to-N comparison (1-to-N verification) between to-be-verified feature information, which is obtained at user verification, and registered feature information stored in the data storage unit 4. The apparatus 1E is realized by a personal computer 1 with a fingerprint sensor 10 attached thereto, and is provided with functions similar to those of a to-be-verified feature information obtaining unit 20, to-be-verified sub-feature information obtaining unit 30, to-be-verified sub-feature information assessing unit 40, registered feature information narrowing unit 50, comparison unit 60, a boundary value setting unit 70, and sub-feature information categorizing unit 80, of the second embodiment. All these functions are realized by the CPU 3 by executing verification programs including a biometric feature information narrowing program. In FIG. 20, like reference numbers and characters designate similar parts or elements throughout several views of the present embodiments, so their detailed description is omitted here.

In the biometric information verifying apparatus 1E, also, to-be-verified biometric information (fingerprint images) of the same body part is input through the fingerprint sensor 10 more than one time at user verification. The to-be-verified sub-feature information obtaining unit 30 of the fifth embodiment extracts and obtains more than one item of to-be-verified sub-feature information from the two or more pieces of to-be-verified biometric information input through the fingerprint sensor 10.

Further, the sub-feature information categorizing unit 80 of the fifth embodiment categorizes, for each item of sub-feature information, the sets of to-be-verified sub-feature information, obtained from the same body part by the to-be-verified sub-feature information obtaining unit 30, according to the boundary values set by the boundary value setting unit 70, and then outputs a category (region; hereinafter called "the most frequent category") into which the greatest number of to-be-verified sub-feature information pieces are categorized.

The to-be-verified sub-feature information assessing unit 40 of the fifth embodiment evaluates, as the acquisition stability, whether or not the number of (hereinafter will be called the "categorization number") to-be-verified sub-feature information pieces categorized in the most frequent category, which is output as the categorization result, exceeds a specific threshold value.

More specifically, the threshold value of the categorization number for each item is previously set and stored in the data storage unit 4. At verification, the to-be-verified sub-feature information assessing unit 40 obtains the specific threshold value from the data storage unit 4, and compares the specific threshold value with the categorization number of the most frequent category obtained by the sub-feature information categorizing unit 80, to evaluate whether or not the categorization number exceeds the threshold value, as the acquisition stability.

On the basis of the comparison result between the categorization number and the threshold value, the match degree calculating unit 52 decides whether or not each item of to-be-verified sub-feature information is to be used in match degree calculation. That is, if the categorization number is equal to or smaller (or just smaller) than the threshold value, the to-be-verified sub-feature information assessing unit 40 decides that the acquisition stability of the item is lower than the acquisition stability of an item whose categorization number exceeds (or is equal to or greater than) the threshold value, and the object item of the assessment is excluded from objects of calculation by the match degree calculating unit 52, so that it is not used in match degree calculation.

In the fifth embodiment, if the categorization number of the most frequent category of an item is equal to or smaller (or just smaller) than a specific threshold value, it means that input variations in the to-be-verified sub-feature information of the item are large, thus indicating that the categorization result is unstable. Therefore, the to-be-verified sub-feature information (the comparison result value) of the item is excluded from objects of match degree calculation with registered sub-feature information, so that the item is not used in the match degree calculation.

Here, in the biometric information verifying apparatus 1E, the fingerprint sensor 10, to-be-verified sub-feature information obtaining unit 30, to-be-verified sub-feature information assessing unit 40, registered feature information narrowing unit 50, boundary value setting unit 70, and sub-feature information categorizing unit 80 form the biometric feature information narrowing apparatus of the fifth embodiment. This biometric feature information narrowing apparatus narrows down the registered feature information that is to be subjected to biometric information comparison. The function of such a biometric feature information narrowing apparatus is realized by the CPU 3 by executing a biometric feature information narrowing program embedded in the foregoing verification program.

Figure 21:
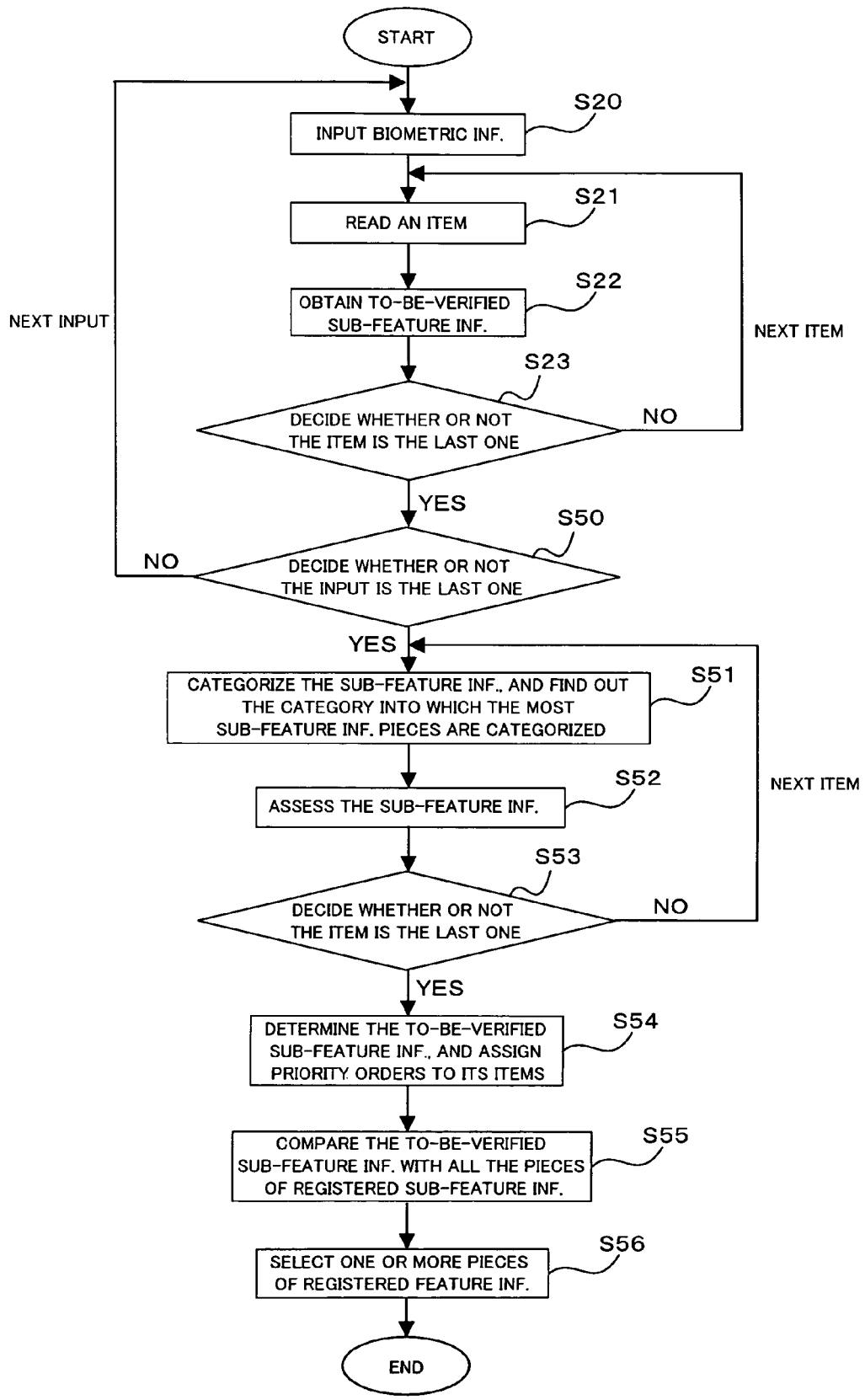
FIG. 21 is a flowchart indicating procedures for narrowing registered feature information according to the fifth embodiment.

Next, referring to the flow chart (steps S20 through S23 and steps S50 through S56) of FIG. 21, a description will be made of an operation of the biometric information verifying apparatus 1E of the fifth embodiment. In FIG. 21, also, the description of acquisition of to-be-verified feature information will be omitted.

As already described, to-be-verified biometric information of the same fingertip is input through the biometric information input unit 10 more than one time at user verification, and to-be-verified sub-feature information of the different items is then obtained by the to-be-verified sub-feature information obtaining unit 30 (steps S20 through S23 and step S50). Since the procedures of steps S20 through S23 and step S50 are similar to the procedures of steps S20 through S23 and step S30 of FIG. 14, the detailed description is omitted here.

After to-be-verified sub-feature information is obtained from all the pieces of biometric feature information (YES decision at step S50), the sub-feature information categorizing unit 80 categorizes, for each item of sub-feature information, the sets of to-be-verified sub-feature information pieces obtained from the same body part by the to-be-verified sub-feature information obtaining unit 30, according to the boundary values set by the boundary value setting unit 70. The sub-feature information categorizing unit 80 also obtains the most frequent category, into which a greatest number of to-be-verified sub-feature information pieces are categorized, and outputs the category as the categorization result of the to-be-verified sub-feature information (step S51).

The to-be-verified sub-feature information assessing unit 40 then evaluates, for each item, whether or not the categorization number in the most frequent category, which is obtained as the categorization result, exceeds a specific threshold value, as the acquisition stability (step S52). These steps S51 and S52 are repeated until it is decided (YES decision of step S53) that the procedures have been completed for all the items.

After the use or non-use of each item in the match degree calculation is determined as priority order (step S54), the sub-feature information comparing unit 51 obtains all the registered sub-feature information from the data storage unit 4, and compares the different items of to-be-verified sub-feature information with a set of different items of registered sub-feature information associated with each piece of registered feature information, and then outputs the comparison result for each item. Further, the match degree calculating unit 52 calculates a degree of matching for each set of registered sub-feature information pieces (that is, for each piece of registered feature information), depending upon the use/non-use information decided at step S54 (step S55).

Here, as the items of to-be-verified sub-feature information to be used in the comparison by the sub-feature information comparing unit 51, an arbitrary one of the to-be-verified sub-feature information pieces belonging to the most frequent category and/or a mean value or a median value of the to-be-verified sub-feature information belonging to the most frequent category are used. The decision on the to-be-verified sub-feature information to be subjected to comparison is made, for example, at step S54 in the fifth embodiment.

After that, like step S27 of FIG. 8, the registered feature information selecting unit 53 assesses match degrees calculated for all the combinations. The registered feature information selecting unit 53 selects registered feature information pieces associated with sets of registered sub-feature information (that is, sets of registered sub-feature information that are similar to the to-be-verified sub-feature information) whose match degree with the to-be-verified sub-feature information is high, from the registered feature information previously registered in the data storage unit 4, so that registered feature information pieces to be subjected to comparison with the to-be-verified feature information are narrowed down (step S56).

In this manner, according to the biometric information verifying apparatus 1E of the fifth embodiment, the use of the most frequent category as a categorization result makes it possible to obtain a stable categorization result. Further, the priority order of an item with a small categorization number in the most frequent category is lowered, and the to-be-verified sub-feature information of the item is excluded from match degrees calculation with registered sub-feature information, so that the item is not used in match degree calculation. This makes it possible to reduce variations in match degree calculated by the match degree calculating unit 52, so that like effects to those of the first embodiment are successfully realized in the fifth embodiment.

[6] Sixth Embodiment

Figure 22:
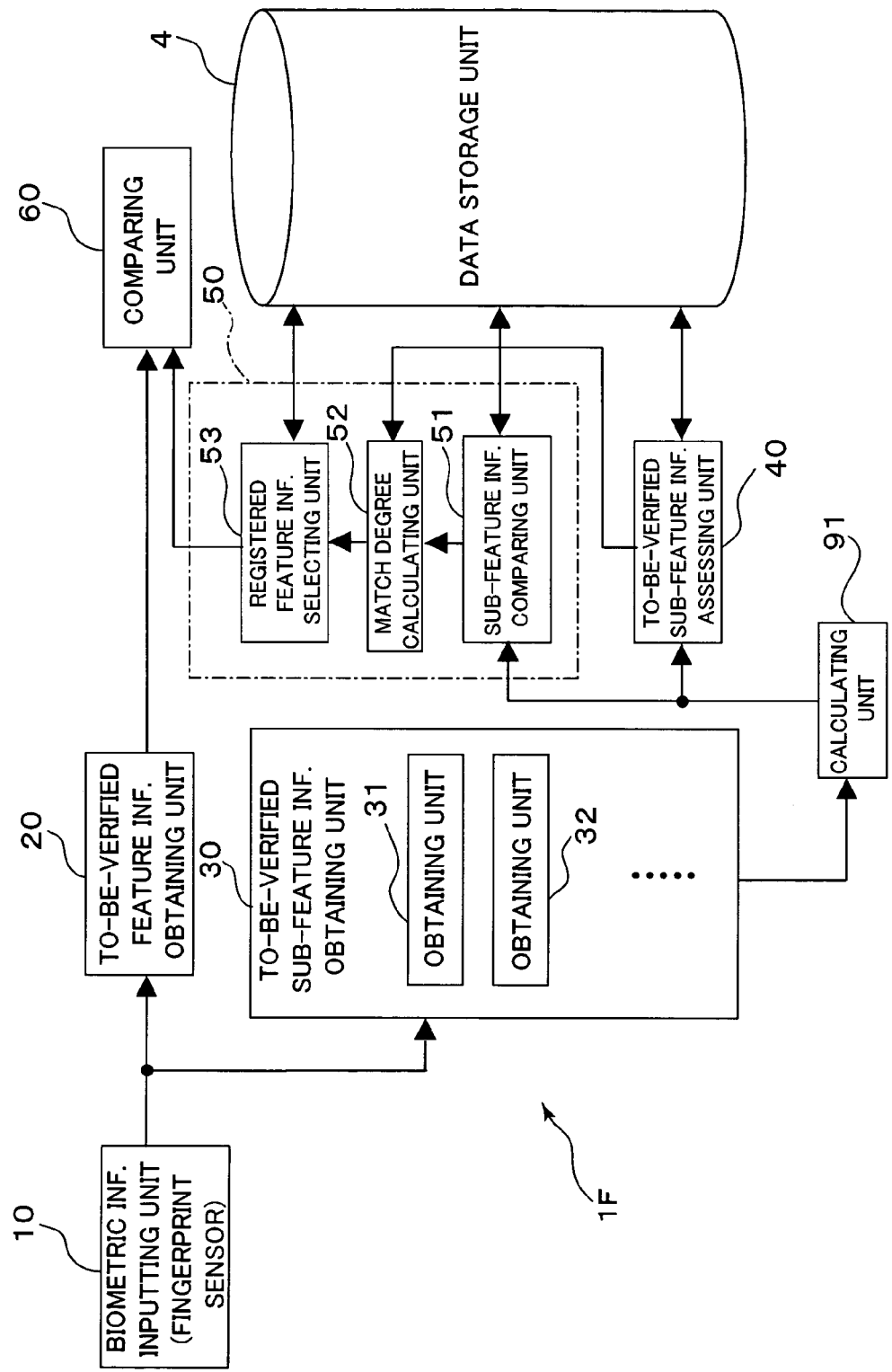
FIG. 22 is a block diagram showing a functional construction of a biometric information verifying apparatus (biometric feature information narrowing apparatus) of a sixth embodiment of the present invention.

FIG. 22 is a block diagram showing a functional construction of a biometric information verifying apparatus (biometric feature information narrowing apparatus) of a sixth embodiment of the present invention. The biometric information verifying apparatus 1F of the sixth embodiment of FIG. 22 also performs 1-to-N comparison (1-to-N verification) between to-be-verified feature information, which is obtained at user verification, and registered feature information stored in the data storage unit 4. The apparatus 1F is realized by a personal computer 1 with a fingerprint sensor 10 attached thereto, and is provided with a function as a calculating unit 91 as well as functions similar to those of a to-be-verified feature information obtaining unit 20, to-be-verified sub-feature information obtaining unit 30, to-be-verified sub-feature information assessing unit 40, registered feature information narrowing unit 50, and comparison unit 60, of the first embodiment. All these functions are realized by the CPU 3 by executing verification programs including a biometric feature information narrowing program. In FIG.22, like reference numbers and characters designate similar parts or elements throughout several views of the present embodiments, so their detailed description is omitted here.

In the biometric information verifying apparatus 1F, also, to-be-verified biometric information (fingerprint images) of the same body part is input through the fingerprint sensor 10 more than one time at user verification. The to-be-verified sub-feature information obtaining unit 30 of the sixth embodiment extracts and obtains more than one item of to-beverified sub-feature information from the two or more pieces of to-be-verified biometric information input through the fingerprint sensor 10.

The calculating unit 91 additionally provided in the sixth embodiment calculates, for each item of the sub-feature information, a mean value and/or median value of the to-be-verified sub-feature information as a statistical value, based on the sets of to-be-verified sub-feature information obtained from the same body part by the to-be-verified sub-feature information obtaining unit 30. In the sixth embodiment, the calculating unit 91 employs the statistical value (mean value and/or median value) calculated for each item of sub-feature information by the calculating unit 91 as a to-be-verified sub-feature information acquisition result obtained by the to-be-verified sub-feature information obtaining unit 30 (obtaining units 31, 32, ...), and inputs the acquisition result into the to-be-verified sub-feature information assessing unit 40 and the sub-feature information comparing unit 51.

Here, in the biometric information verifying apparatus 1F, the fingerprint sensor 10, to-be-verified sub-feature information obtaining unit 30, to-be-verified sub-feature information assessing unit 40, registered feature information narrowing unit 50, boundary value setting unit 70, sub-feature information categorizing unit 80, and calculating unit 91 form the biometric feature information narrowing apparatus of the sixth embodiment. This biometric feature information narrowing apparatus narrows down the registered feature information that is to be subjected to biometric information comparison. The function of such a biometric feature information narrowing apparatus is realized by the CPU 3 by executing a biometric feature information narrowing program embedded in the foregoing verification program.

Figure 23:
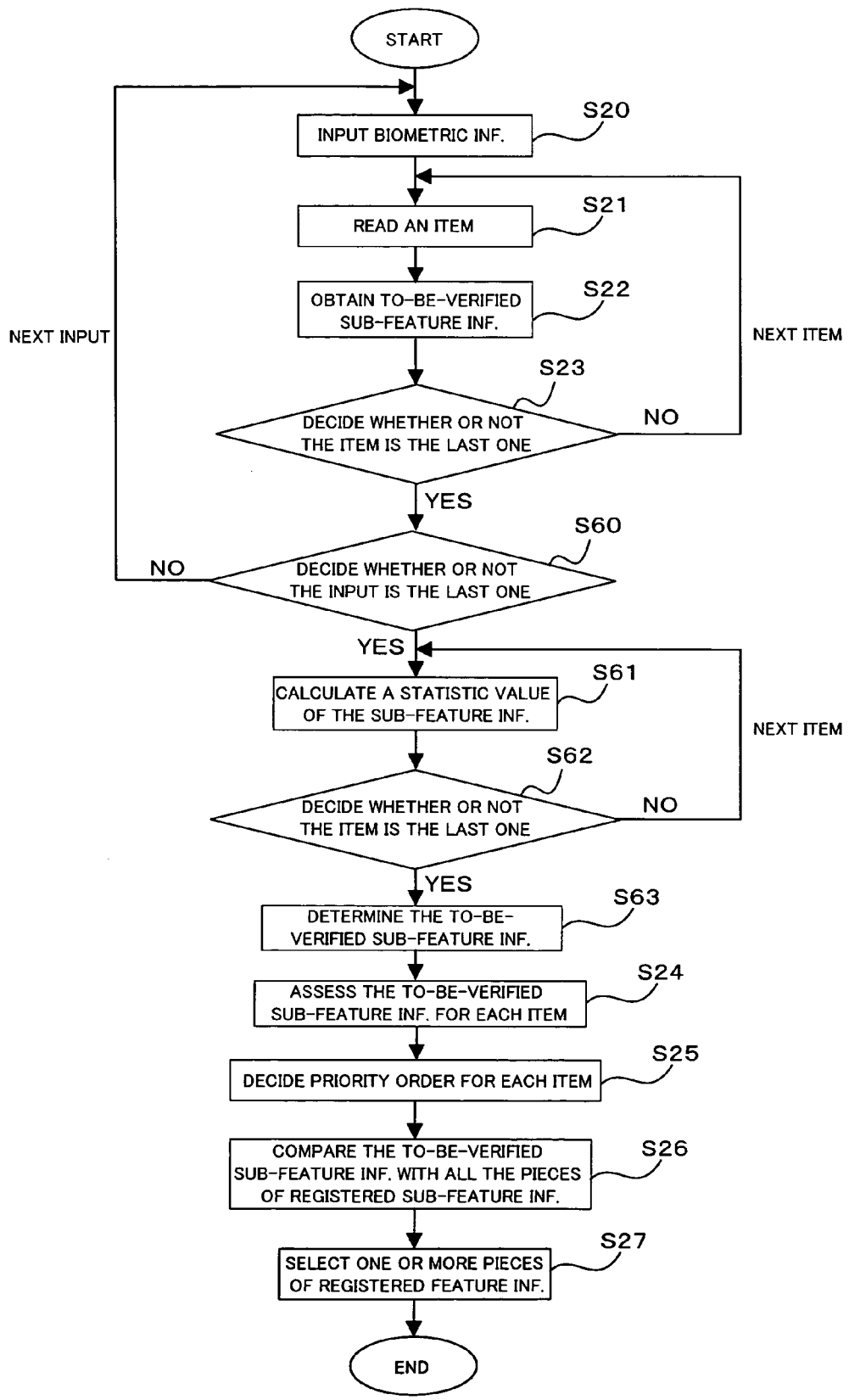
FIG. 23 is a flowchart indicating procedures for narrowing registered feature information according to the sixth embodiment.

Next, referring to the flow chart (steps S20 through S27 and steps S60 through S63) of FIG. 23, a description will be made of an operation of the biometric information verifying apparatus 1F of the sixth embodiment. In FIG. 23, also, the description of acquisition of to-be-verified feature information will be omitted.

The procedures of FIG. 23 are a combination of the registered feature information narrowing procedures (steps S20 through S27) of the first embodiment in FIG. 8 and the procedures steps S60 through S63.

As is already described, to-be-verified biometric information of the same fingertip is input through the biometric information input unit 10 more than one time at user verification, and to-be-registered sub-feature information of the different items is then obtained by the to-be-registered sub-feature information obtaining unit 30 (steps S20 through S23 and step S60). Since the procedures of steps S20 through S23 and step S60 are similar to the procedures of steps S20 through S23 and step S30 of FIG. 14, the detailed description is omitted here. In addition, since the procedures of steps S20 through S27 are similar to the procedures of steps S24 through S27 of FIG. 8, the detailed description is also omitted here.

After to-be-verified sub-feature information is obtained from all the pieces of biometric feature information (YES decision at step S60), the calculating unit 91 calculates a mean value and/or a median value of the to-be-verified sub-feature information, based on the sets of to-be-verified sub-feature information obtained at steps S20 through S23 and step S60 (step S61). This step S61 is repeated until it is decided (YES decision of step S62) that the procedure has been completed for all the items.

After the mean value and/or the median value of each item of to-be-verified sub-feature information is calculated as a statistical value, and the statistical value is decided as the to-be-verified sub-feature information of the item (step S63), narrowing down of registered feature information is performed in a similar manner to the second embodiment. The difference is that the sub-feature information comparing unit 51 compares the thus-obtained mean value and/or median value of each item of to-be-verified sub-feature information with registered sub-feature information.

In this manner, according to the biometric information verifying apparatus 1F of the sixth embodiment, the use of the mean value and/or the median value calculated for each item of to-be-verified sub-feature information as to-be-verified sub-feature information, makes it possible to obtain more stable sub-feature information than to-be-verified sub-feature information that is obtained from to-be-verified biometric information input only once.

In the sixth embodiment, the description is made on a case where the calculating unit 91 is added to the construction of the first embodiment. The calculating unit 91 can also be added to each of the second through the fifth embodiments, so that the mean and the median value of to-be-verified sub-feature information calculated by the calculating unit 91 for each item is used as to-be-verified sub-feature information in those embodiments. In such cases, it is possible to obtain not only stable to-be-verified sub-feature information but also stable categorization results.

[7] Seventh Embodiment

Figure 24:
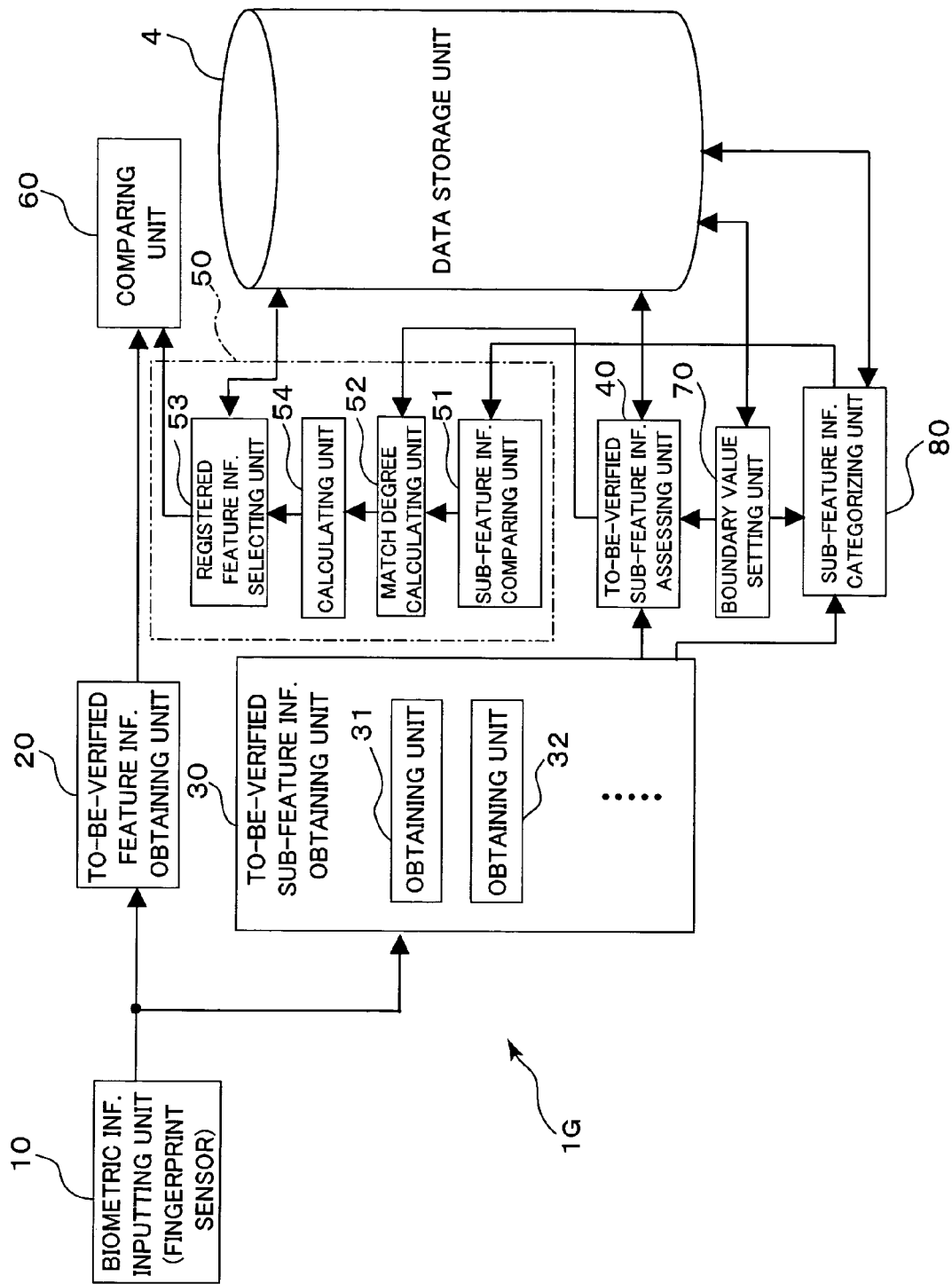
FIG. 24 is a block diagram showing a functional construction of a biometric information verifying apparatus (biometric feature information narrowing apparatus) of a seventh embodiment of the present invention.

FIG. 24 is a block diagram showing a functional construction of a biometric information verifying apparatus (biometric feature information narrowing apparatus) of a seventh embodiment of the present invention The biometric information verifying apparatus 1G of the seventh embodiment of FIG. 24 also performs 1-to-N comparison (1-to-N verification) between to-be-verified feature information, which is obtained at user verification, and registered feature information stored in the data storage unit 4. The apparatus 1G is realized by a personal computer 1 with a fingerprint sensor 10 attached thereto, and is provided with functions as a to-be-verified feature information obtaining unit 20, to-be-verified sub-feature information obtaining unit 30, to-be-verified sub-feature information assessing unit 40, registered feature information narrowing unit 50, and comparison unit 60, a boundary value setting unit 70, and sub-feature information categorizing unit 80, as in the cases of the second and the fifth embodiment. In the seventh embodiment, the registered feature information narrowing unit 50 has functions not only as the sub-feature information comparing unit 51, match degree calculating unit 52, registered feature information selecting unit 53, but also as a calculating unit 54. All these functions are realized by the CPU 3 by executing verification programs including a biometric feature information narrowing program. In FIG. 24, like reference numbers and characters designate similar parts or elements throughout several views of the present embodiments, so their detailed description is omitted here.

In the biometric information verifying apparatus 1G, also, to-be-verified biometric information (fingerprint images) of the same body part is input through the fingerprint sensor 10 more than once at user verification. The to-be-verified sub-feature information obtaining unit 30 of the fifth embodiment extracts and obtains more than one item of to-be-verified sub-feature information from the two or more pieces of to-be-verified biometric information input through the fingerprint sensor 10. Further, the to-be-verified sub-feature information assessing unit 40 assesses the acquisition stability of each item of to-be-verified sub-feature information of each set of to-be-verified sub-feature information pieces obtained from the same body part.

In the seventh embodiment, as in the case of the second embodiment, a match degree between each set of to-be-verified sub-feature information pieces obtained from the same body part and one set of registered sub-feature information stored in the data storage unit 4 is calculated.

That is, the sub-feature information categorizing unit 80 categorizes the to-be-verified sub-feature information and the aforementioned one set of registered feature information pieces, and the sub-feature information comparing unit 51 performs comparison using the categorization result obtained by the sub-feature information categorizing unit 80, and the match degree calculating unit 52 calculates a match degree between the to-be-verified sub-feature information and the one set of registered sub-feature information pieces, based on the comparison result by the sub-feature information comparing unit 51 and on the acquisition stability assessment result obtained by the to-be-verified sub-feature information assessing unit 40.

As a result, match degrees between the one set of registered sub-feature information pieces and each set of to-be-verified sub-feature information pieces are calculated. That is, the number of thus calculated match degrees with the one set of registered sub-feature information pieces, is equal to the number (the number of times the biometric information is input) of to-be-verified sub-feature information pieces.

On the basis of the match degrees (with the aforementioned one set of registered feature information pieces) calculated for the sets of to-be-verified sub-feature information, the calculating unit 54, newly added in the seventh embodiment, calculates a mean and/or a median value of the match degrees as a statistical value. In the seventh embodiment, the statistical value (mean and/or median values) calculated by the calculating unit 54 is employed as a match degree between the to-be-verified sub-feature information and the above-mentioned one set of registered sub-feature information pieces, and is then input to the registered feature information selecting unit 53. Such a match degree, as a statistical value, is calculated for all the sets of registered sub-feature information stored in the data storage unit 4.

Here, in the biometric information verifying apparatus 1G, the fingerprint sensor 10, to-be-verified sub-feature information obtaining unit 30, to-be-verified sub-feature information assessing unit 40, registered feature information narrowing unit 50, boundary value setting unit 70, and sub-feature information categorizing unit 80 form the biometric feature information narrowing apparatus of the seventh embodiment. This biometric feature information narrowing apparatus narrows down the registered feature information that is to be subjected to biometric information comparison. The function of such a biometric feature information narrowing apparatus is realized by the CPU 3 by executing a biometric feature information narrowing program embedded in the foregoing verification program.

Figure 25:
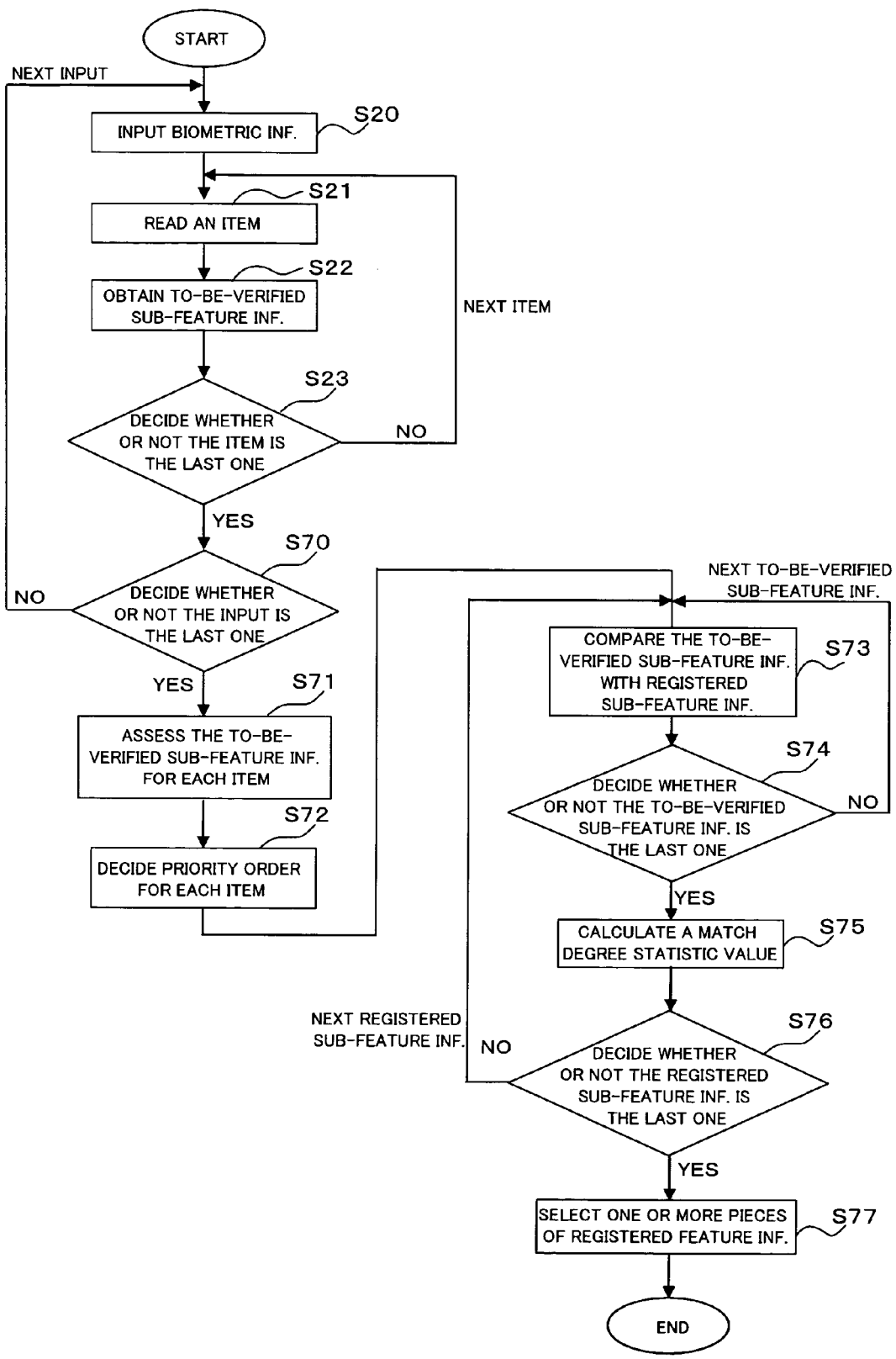
FIG. 25 is a flowchart indicating procedures for narrowing registered feature information according to the seventh embodiment.

Next, referring to the flow chart (steps S20 through S23 and steps S70 through S77) of FIG. 25, a description will be made of an operation of the biometric information verifying apparatus 1G of the seventh embodiment. In FIG. 25, also, the description of acquisition of to-be-verified feature information will be omitted.

As is already described, to-be-verified biometric information of the same fingertip is input through the fingerprint sensor 10 more than one time at user verification, and to-be-registered sub-feature information of the different items is then obtained by the to-be-registered sub-feature information obtaining unit 30 (steps S20 through S23 and step S70). Since the procedures of steps S20 through S23 and step S70 are similar to the procedures of steps S20 through S23 and step S30 of FIG. 14, the detailed description is omitted here.

After to-be-verified sub-feature information is obtained from all the pieces of biometric feature information (YES decision at step S70), an acquisition stability of each item of to-be-verified sub-feature information is assessed for each of the sets of to-be-verified sub-feature information obtained from the same body part (step S71), and weights (priority orders of the items) corresponding to the assessment result are assigned (step S72).

Next, one set of registered sub-feature information pieces obtained from the data storage unit 4 is subjected to the following procedures of step S73 through S75, and a match degree with the registered sub-feature information is calculated as a static value.

That is, as is already described above, the sub-feature information categorizing unit 80 categorizes the to-be-verified sub-feature information and the aforementioned one set of registered feature information pieces, and the sub-feature information comparing unit 51 performs comparison between the registered sub-feature information categorization result and the to-be-verified sub-feature information categorization result obtained by the sub-feature information categorizing unit 80, and the match degree calculating unit 52 calculates a match degree between the to-be-verified sub-feature information and the one set of registered sub-feature information pieces, based on the comparison result value obtained by the sub-feature information comparing unit 51 and on the acquisition stability assessment result (that is, weight-assignment result at step S72) obtained by the to-be-verified sub-feature information assessing unit 40 (step S73). The procedure of step S73 is repeated until it is decided that the procedure has been completed for all the sets of to-be-verified sub-feature information (YES decision at step S74).

After match degrees between one set of registered sub-feature information pieces and different sets of to-be-verified sub-feature information are calculated, and two or more (the number of times of biometric information input) match degree values are calculated, the calculating unit 54 calculates a mean and/or a median value of the different match degrees, and the calculated value (statistical value) is employed as a match degree with the set of registered sub-feature information pieces (step S75).

After that, the procedures of steps S73 through S75 are repeated until it is decided (YES decision at step S76) the procedures have been completed for all the sets of registered sub-feature information stored in the data storage unit 4.

Then, the registered feature information selecting unit 53 assesses the match degrees calculated for all the sets of registered sub-feature information pieces, as in the case of step S27 of FIG. 8. The registered feature information selecting unit 53 then selects registered feature information associated with sets of registered sub-feature information with a high match degree with to-be-verified sub-feature information (that is, sets of registered sub-feature information similar to the object to-be-verified sub-feature information), of the registered feature information previously stored in the data storage unit 4, thereby narrowing the registered feature information to be compared with the object to-be-verified feature information (step S77).

In this manner, according to the biometric information verifying apparatus 1G of the seventh embodiment, the mean and/or the median value obtained by the calculating unit 91 is used as a match degree, so that the thus obtained match degree is more stable than the match degree obtained from the to-be-verified biometric that is input only once.

[8] Eighth Embodiment

Figure 26:
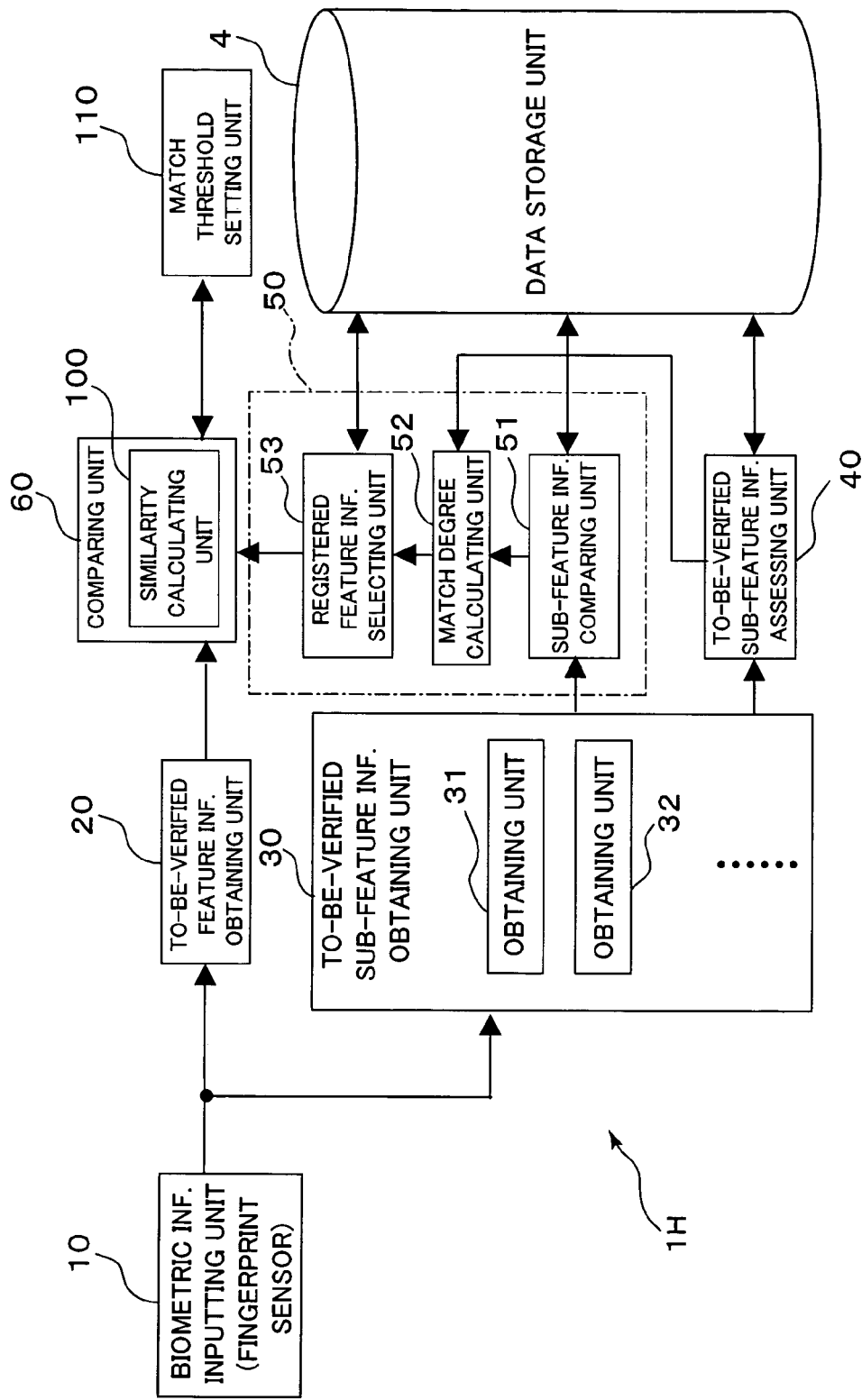
FIG. 26 is a block diagram showing a functional construction of a biometric information verifying apparatus (biometric feature information narrowing apparatus) of an eighth embodiment of the present invention.

FIG. 26 is a block diagram showing a functional construction of a biometric information verifying apparatus (biometric feature information narrowing apparatus) of an eighth embodiment of the present invention. The biometric information verifying apparatus 1H of the eighth embodiment of FIG. 26 also performs 1-to-N comparison (1-to-N verification) between to-be-verified feature information, which is obtained at user verification, and registered feature information stored in the data storage unit 4. The apparatus 1H is realized by a personal computer 1 with a fingerprint sensor 10 attached thereto, and is provided with functions as a similarity calculating unit 100 and a match threshold setting unit 110 as well as functions similar to those of a to-be-verified feature information obtaining unit 20, to-be-verified sub-feature information obtaining unit 30, to-be-verified sub-feature information assessing unit 40, registered feature information narrowing unit 50, and comparison unit 60, of the first embodiment. All these functions are realized by the CPU 3 by executing verification programs including a biometric feature information narrowing program. In FIG. 26, like reference numbers and characters designate similar parts or elements throughout several views of the present embodiment and the conventional art, so their detailed description is omitted here.

Similar to the biometric information verifying apparatus 1C of the third embodiment, in the biometric information verifying apparatus 1H, to-be-verified biometric information (fingerprint images) of the same body part is input through the fingerprint sensor 10 more than one time at user verification, to obtain two or more pieces of to-be-verified biometric information. The to-be-verified feature information obtaining unit 20 extracts to-be-verified feature information (feature information including information about minutiae) from the two or more pieces of to-be-verified biometric information input through the fingerprint sensor 10. The to-be-verified sub-feature information obtaining unit 30 of the eighth embodiment extracts and obtains more than one item of to-be-verified sub-feature information from the two or more pieces of to-be-verified biometric information input through the fingerprint sensor 10.

The similarity calculating unit 100 selects two arbitrary pieces of to-be-verified feature information, of the pieces of to-be-verified feature information obtained by the to-be-verified feature information obtaining unit 20, and compares the two, to calculate a similarity between the two. Here, the function of the similarity calculating unit 100 is realized by using the function of the comparison unit 60 without any modification. In other words, in the eighth embodiment, the comparison unit 60 functions also as the similarity calculating unit 100.

The match threshold setting unit 110 calculates a statistical value of the two or more similarity values calculated by the similarity calculating unit 100. On the basis of the statistical value, the match threshold setting unit 110 calculates a match threshold value, which is a parameter for making a decision on agreement between registered feature information and to-be-verified feature information by the comparison unit 60, and sets the match threshold value in the comparison unit 60.

Figure 27:
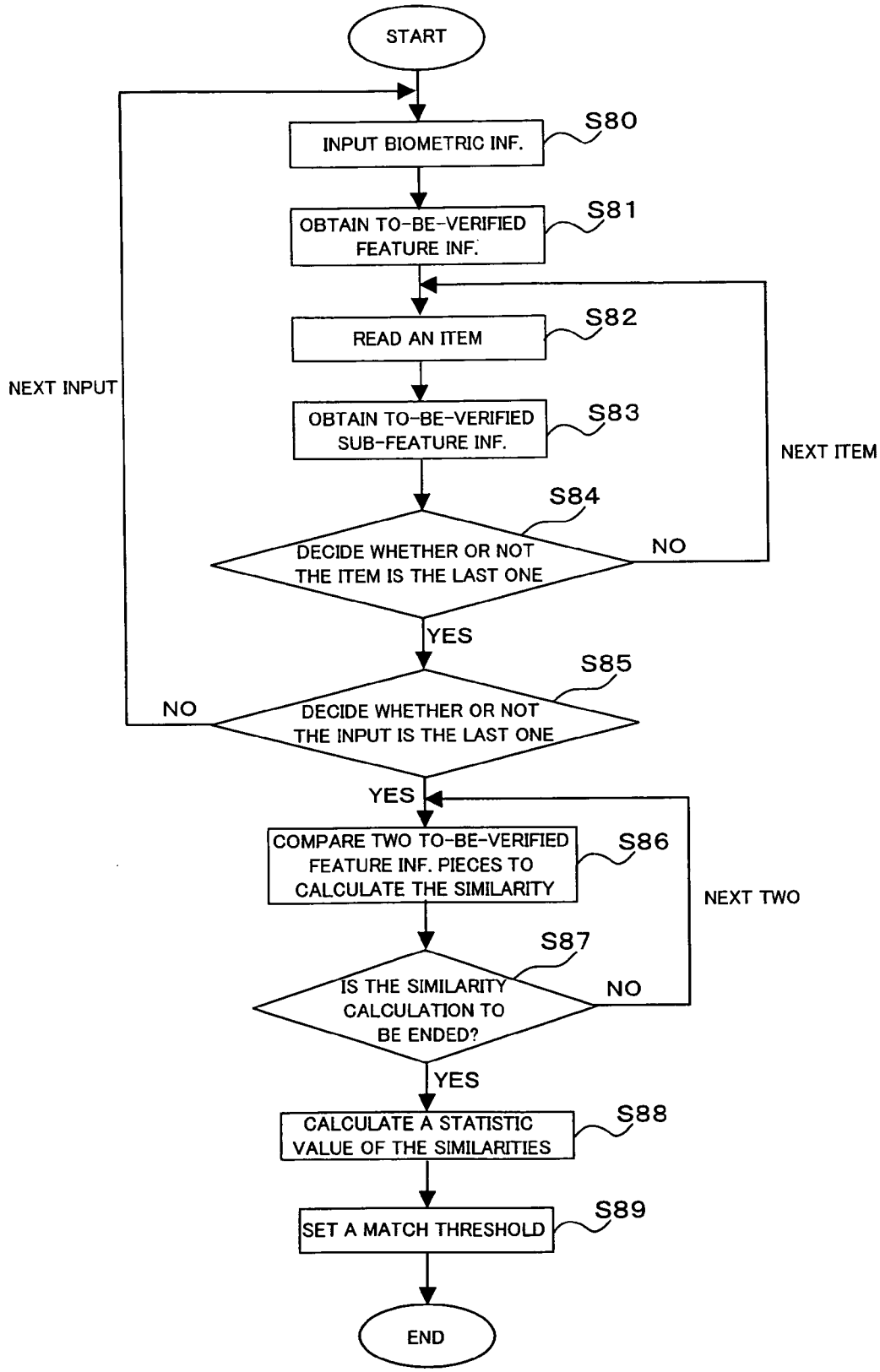
FIG. 27 is a flowchart indicating procedures for setting match thresholds according to the eighth embodiment.

Next, referring to the flow chart (steps S80 through S89) of FIG. 27, a description will be made of an operation (match threshold setting procedure) of the biometric information verifying apparatus 1H of the eighth embodiment.

As is already described, to-be-verified biometric information of the same fingertip is input through the fingerprint sensor 10 more than one time at user verification, and the to-be-verified feature information obtaining unit 20 obtains to-be-verified feature information from the pieces of to-be-verified biometric information, and the to-be-verified sub-feature information obtaining unit 30 obtains two or more items of to-be-registered sub-feature information (steps S80 through S85).

After to-be-verified biometric information is input through the fingerprint sensor 10 (step S80), the to-be-verified feature information obtaining unit 20 obtains to-be-verified feature information from the to-be-verified biometric information (step S81). Then, as in the case of steps S12 through S14 of FIG. 6, items of sub-feature information to be acquired are read out one by one (step S82), and to-be-verified sub-feature information of the thus read-out item is obtained by the to-be-verified sub-feature information obtaining unit 30 (step S83).

After that, it is evaluated whether or not the present item, which is the current object of the sub-feature information acquisition, is the last one, that is, whether or not all the items of to-be-registered sub-feature information are obtained (step S84). If the evaluation result is negative (NO route of step S84), the process returns to step S82, whereas if the evaluation result is positive (YES route of step S84), it is then evaluated whether or not the current to-be-verified biometric information is the last piece (step S85). If the evaluation result is negative (NO route of step S85), the process returns to step S80, and to-be-verified feature information and two or more items of to-be-verified sub-feature information are obtained from the next to-be-verified biometric information piece.

On the other hand, if the evaluation result is positive (YES route of step S85), an arbitrary two of the pieces of to-be-verified feature information are selected and compared by way of a function (comparison unit 60) of the similarity calculating unit 100, and the similarity between the two is then calculated (step S86). After that, it is decided whether or not the similarity calculation should be completed (whether or not a specific number of similarity values are calculated) (step S87). If the calculation should not be completed (NO route of step 87), the process returns to step S86, and the similarity calculation is performed once again for another two of the to-be-verified feature information.

After obtaining the specific number of similarity values, the similarity calculation thereby being completed (YES route of step S87), the match threshold setting unit 110 calculates a statistical value of the two or more (a specific number) similarity values thus obtained (step S88), and on the basis of the statistical value, the match threshold setting unit 110 calculates a match threshold, which serves as a parameter for making a decision about the agreement, and sets the obtained threshold in the comparison unit 60 (step S89).

At that time, on the basis of the similarity values, the match threshold setting unit 110 calculates, as statistical values, a standard deviation, a mean value, a median value, the maximum value, and the minimum value of the similarity values. Using the thus obtained statistical values, the match threshold setting unit 110 decides a match threshold. For instance, the minimum value can be used as the match threshold, without making any modification thereto. Alternatively, assuming that the two or more similarity values have a normal distribution, the match threshold can be obtained by the formula: [the mean value−the standard deviation×3].

Although its description is omitted in the eighth embodiment, narrowing-down process of registered feature information, described in the first through the seventh embodiment, is carried out, based on the to-be-verified sub-feature information obtained at step S83, in parallel with the procedures of steps S86 through S89.

On the comparison unit 60, a 1-to-N comparison between to-be-verified feature information and narrowed-down registered feature information is performed based on the match threshold set by the match threshold stetting unit 110, and a piece of registered feature information with a greatest similarity to the to-be-verified feature information, out of the narrowed-down registered feature information, is identified as the registered feature information belonging to the object user. Here, the to-be-verified feature information used in comparison by the comparison unit 60 is, for example, an arbitrary one of the pieces of to-be-verified feature information, and/or a mean or a median value of the pieces of to-be-verified feature information, and/or a single piece of to-be-verified feature information obtained after match threshold setting.

In this manner, according to the biometric information verifying apparatus 1H of the eighth embodiment, the match threshold is calculated and set based on a statistical value of the similarity between pieces of to-be-verified feature information obtained from the same body part of the user to be verified. Therefore, in order to succeed in verification of registered feature information against the to-be-verified feature information, the similarity between the registered feature information and the to-be-verified feature information must be higher than the similarity (statistical value) between the user's pieces of to-be-verified feature information. It is thus possible to greatly reduce the possibility of false verification, where a different user's registered feature information is erroneously identified and verified, so that the occurrence of false verification in a 1-to-many comparison is reliably prevented. Here, in the eighth embodiment, the similarity calculating unit 100 and the match threshold setting unit 110 are added to the construction of the first embodiment, and the similarity calculating unit 100 and the match threshold setting unit 110 can also be added to the constructions of the second through the seventh embodiments.

[9] Other Modifications

The present invention should by no means be limited to the above embodiments, and various changes or modifications may be suggested without departing from the gist of the invention.

For example, in the above embodiments, the biometric information is a fingerprint image, but other types of biometric information, such as iris pattern images, facial images, palm images, blood vessel pattern images, retina pattern images, voice pattern images, signature images, are also applicable. Further, two or more types of biometric information can be used in combination.

Further, in the above embodiments, the function of the biometric information verifying apparatus, 1A through 1H, and the function of the biometric information registering apparatus 2 are realized by a single personal computer 1. However, these functions can be realized by separate terminal apparatus (personal computer, etc.) that are communicably connected therebetween through a communication network. In this case, also, like effects and benefits to those of the foregoing embodiments are realized.

Furthermore, application programs (a verification program including a biometric feature information narrowing program and a registration program) for realizing the functions of the biometric information verifying apparatus, 1A through 1H, and of the biometric information registering apparatus 2, are recorded in computer-readable recording media such as flexible discs, CD-ROMs, CD-Rs, CD-RWs, and DVDs. The computer reads the programs from such recording media to transfer the programs to an internal or external storage device, to store the programs therein. Alternatively, the programs can be recorded in storage devices (recording media) such as magnetic discs, optical discs, and magneto-optical discs, to be transferred to the computer over a communication network.

Here, the "computer" is defined as a concept including hardware and an OS (Operating System), or hardware operating under control of an OS. Further, in cases where hardware is capable of operating by itself without the necessity of an OS, the hardware is equivalent to the "computer." The hardware includes at least a micro processor such as a CPU and a means for reading computer programs from recording media. The aforementioned predetermined application programs (verification/registration programs) contain program codes that instruct the computer to function as the biometric information verifying apparatus, 1A through 1H, and the biometric information registering apparatus 2. Further, a part of those functions can be realized by the OS, not by such application programs.

Moreover, as recording media used in the embodiments of the present invention, not only the above-mentioned flexible discs, CR-ROMs, CD-Rs, CD-RWs, DVDs, magnetic discs, optical discs, and magneto-optical discs, but also various types of other computer-readable media, such as IC cards, ROM cartridges, magnetic tapes, punch cards, internal storage devices (memories such as RAMs and ROMs), external storage devices, and printed matter with any codes such as barcodes printed thereon, are also applicable.

What is claimed is:

1. A biometric information verifying apparatus for authorizing a user, utilizing biometric information, comprising:

a data storage unit storing registered feature information obtained from biometric information for registry that is acquired from registered users at enrollment, and a plurality of items of registered sub-feature information obtained from the biometric information for registry, in association with each other;

a biometric information input unit for inputting to-be-verified biometric information of a user to-be-verified;

a to-be-verified feature information obtaining unit which obtains to-be-verified feature information from the to-be-verified biometric information input by said biometric information input unit;

a to-be-verified sub-feature information obtaining unit which obtains a plurality of items of to-be-verified sub-feature information from the to-be-verified biometric information input by said biometric information input unit;

a to-be-verified sub-feature information assessing unit which assesses acquirement stability of an individual item of to-be-verified sub-feature information, based on the plurality of items of to-be-verified sub-feature information obtained by said to-be-verified sub-feature information obtaining unit;

a registered feature information narrowing unit which selects one or more pieces of registered feature information, of the previously registered feature information of the registered users, to be subjected to comparison with the to-be-verified feature information obtained by said to-be-verified feature information obtaining unit, based on the plurality of items of to-be-verified sub-feature information and the plurality of items of registered sub-feature information, and on the acquirement stability assessment result obtained by said to-be-verified sub-feature information assessing unit; and a comparing unit which compares said one or more pieces of registered feature information selected by said registered feature information narrowing unit and the to-be-verified feature information obtained by said to-be-verified feature information obtaining unit in order to determine whether the user to-be-verified is among the registered users.

2. A biometric information verifying apparatus as set forth in claim 1, wherein said registered feature information narrowing unit including:

a sub-feature information comparing unit which compares the plurality of items of to-be-verified sub-feature information and the plurality of items of registered sub-feature information associated with each piece of registered feature information, respectively, to obtain a comparison result value for each item of sub-feature information;

a match degree calculating unit which calculates a match degree between the plurality of items of to-be-verified sub-feature information and the plurality of items of registered sub-feature information for each piece of registered feature information, based on the comparison result values obtained by said sub-feature information comparing unit and on the acquirement stability assessment result obtained by said to-be-verified sub-feature information assessing unit; and a registered feature information selecting unit which selects said one or more pieces of registered feature information according to the match degrees calculated by said match degree calculating unit.

3. A biometric information verifying apparatus as set forth in claim 2, wherein said match degree calculating unit weights the comparison result values, each obtained by said sub-feature information comparing unit for each item of sub-feature information, according to the acquirement stability assessment result, and calculates a total sum of weighted comparison result values to obtain a calculation result as the match degree for each piece of registered feature information.

4. A biometric information verifying apparatus as set forth in claim 3, wherein the greater the acquirement stability, the greater the weights assigned to the comparison result values.

5. A biometric information verifying apparatus as set forth in claim 3, further comprising:

a boundary value setting unit which provides one or more boundary values for each item of sub-feature information; and a sub-feature information categorizing unit which categorizes, for each item of sub-feature information, the registered sub-feature information and the to-be-verified sub-feature information according to the boundary values provided by said boundary value setting unit, said to-be-verified sub-feature information assessing unit evaluating, for each item of sub-feature information, whether or not any of such boundary values is present in a specific range of values whose center value is a value of each item of to-be-verified sub-feature information, as the acquirement stability, and then if the evaluation result is positive, the acquirement stability is assessed to be lower than where such boundary value is absent in the specific range, whereas if the evaluation result is negative, the acquirement stability is assessed to be higher than where such boundary value is present in the specific range, said sub-feature information comparing unit comparing, for each item of sub-feature information, the to-be-verified sub-feature information categorization result obtained by said sub-feature information categorizing unit with the registered sub-feature information categorization result obtained by said sub-feature information categorizing unit, and if the acquirement stability is assessed to be high, said match degree calculating unit assigning a higher weight to the comparison result value than where the acquirement stability is assessed to be low.

6. A biometric information verifying apparatus as set forth in claim 2, further comprising:

a boundary value setting unit which provides one or more boundary values for each item of sub-feature information; and a sub-feature information categorizing unit which categorizes, for each item of sub-feature information, the registered sub-feature information and the to-be-verified sub-feature information according to the boundary values provided by said boundary value setting unit, said sub-feature information comparing unit comparing, for each item of sub-feature information, the to-be-verified sub-feature information categorization result obtained by said sub-feature information categorizing unit with the registered sub-feature information categorization result obtained by said sub-feature information categorizing unit.

7. A biometric information verifying apparatus as set forth in claim 6, wherein said to-be-verified sub-feature information assessing unit evaluates, for each item of sub-feature information, whether or not any of such boundary values is present in a specific range of values whose center value is a value of each item of to-be-verified sub-feature information, as the acquirement stability.

8. A biometric information verifying apparatus as set forth in claim 6, wherein said biometric information input unit inputs to-be-verified biometric information obtained from a same body part more than one time to acquire more than one piece of to-be-verified biometric information, wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information, wherein said apparatus further comprises a statistical value calculating unit which calculates, for each item of sub-feature information, a statistical value of said each piece of to-be-verified sub-feature information, based on the sets of to-be-verified sub-feature information pieces obtained from the same body part by said to-be-verified sub-feature information obtaining unit, and wherein said boundary value setting unit determines, for each item of sub-feature information, at least one of a number of the boundary values and intervals among the boundary values, based on the statistical value calculated by said statistical value calculating unit.

9. A biometric information verifying apparatus as set forth in claim 6, wherein said biometric information input unit inputs to-be-verified biometric information obtained from a same body part more than one time to acquire more than one piece of to-be-verified biometric information, wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information, and wherein said sub-feature information categorizing unit categorizes, for each item of sub-feature information, the same item of more than one piece included in said sets of to-be-verified sub-feature information pieces, which is obtained from the same body part by said to-be-verified sub-feature information obtaining unit, according to the boundary value provided by said boundary value setting unit, and then outputs a category into which the most to-be-verified sub-feature information pieces are categorized, as a categorization result of the to-be-verified sub-feature information.

10. A biometric information verifying apparatus as set forth in claim 9, wherein said to-be-verified sub-feature information assessing unit evaluates, for each item of sub-feature information, whether or not the number of to-be-verified sub-feature information pieces categorized in the category which is output as the categorization result exceeds a specific threshold, as the acquirement stability, and wherein, if the evaluation result obtained by said to-be-verified sub-feature information assessing unit is negative, said match degree calculating unit excludes the sub-feature information from objects of the match degree calculation.

11. A biometric information verifying apparatus as set forth in claim 6, wherein said biometric information input unit inputs to-be-verified biometric information obtained from a same body part more than one time to acquire more than one piece of to-be-verified biometric information, wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information, wherein, for said each set of to-be-verified sub-feature information pieces, said sub-feature information categorizing unit categorizes, for each item of sub-feature information, categorizes the registered sub-feature information and the obtained to-be-verified sub-feature information, and said sub-feature information comparing unit performs comparison using the categorization result obtained by said sub-feature information categorizing unit, and said match degree calculating unit calculates the match degree, based on the comparison result value obtained by said sub-feature information comparing unit and on the acquirement stability assessment result obtained by said to-be-verified sub-feature information assessing unit, wherein said apparatus further comprises a calculating unit which calculates at least one of a mean value and a median value of the match degrees, for said each piece of to-be-verified biometric information, as the statistical value, and wherein the statistical value obtained by said calculating unit is used as a match degree of the to-be-verified sub-feature information of the same body part.

12. A biometric information verifying apparatus as set forth in claim 2, wherein said match degree calculating unit excludes each item of to-be-verified sub-feature information whose acquirement stability is assessed to be low, from objects of the match degree calculation.

13. A biometric information verifying apparatus as set forth in claim 1, wherein said biometric information input unit inputs to-be-verified biometric information obtained from a same body part more than one time to acquire more than one piece of to-be-verified biometric information, wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information, wherein said apparatus further comprises a statistical value calculating unit which calculates, for each item of sub-feature information, a statistical value of said each item of to-be-verified sub-feature information, based on the sets of to-be-verified sub-feature information pieces obtained from the same body part by said to-be-verified sub-feature information obtaining unit, and wherein said to-be-verified sub-feature information assessing unit assesses, for each item of sub-feature information, the acquirement stability, based on the statistical value calculated by said statistical value calculating unit.

14. A biometric information verifying apparatus as set forth in claim 13, wherein said to-be-verified sub-feature information assessing unit evaluates, for each item of sub-feature information, whether or not the statistical value calculated by said statistical value calculating unit exceeds a specific threshold, as the acquirement stability, and wherein said match degree calculating unit excludes each item of to-be-verified sub-feature information which said to-be-verified sub-feature information assessing unit evaluates exceeds the threshold, from objects of the match degree calculation.

15. A biometric information verifying apparatus as set forth in claim 1, wherein said biometric information input unit inputs to-be-verified biometric information obtained from a same body part more than one time to acquire more than one piece of to-be-verified biometric information, wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information, wherein said apparatus further comprises a calculating unit which calculates, for each item of sub-feature information, at least one of a mean value and a median value of said to-be-verified sub-feature information pieces, as the static value thereof, based on the sets of to-be-verified sub-feature information pieces obtained from the same body part by said to-be-verified sub-feature information obtaining unit, and wherein the static value obtained by said calculating unit for each item of sub-feature information is used as a to-be-verified sub-feature information acquirement result obtained by said to-be-verified sub-feature information obtaining unit.

16. A biometric information verifying apparatus as set forth in claim 1, wherein said biometric information input unit inputs to-be-verified biometric information obtained from a same body part more than one time to acquire more than one piece of to-be-verified biometric information, wherein said to-be-verified feature information obtaining unit obtains to-be-verified feature information from each of said more than one piece of to-be-verified biometric information, to acquire more than one piece of to-be-verified feature information, and wherein said apparatus further comprises:

a similarity calculating unit which compares arbitrary twos of said more than one piece of to-be-verified feature information obtained by said to-be-verified feature information obtaining unit, and calculates similarities between the twos; and a match threshold setting unit which calculates a statistical value of the similarities obtained by said similarity calculating unit, and which calculates, based on the statistical value, a match threshold that is used by said comparing unit as a reference value for deciding matching between registered feature information and to-be-verified feature information, and which sets the calculated match threshold in said comparing unit.

17. A biometric feature information narrowing apparatus operable to narrow registered feature information to be subjected to comparison when biometric user verification is performed, comprising:

a data storing unit storing registered feature information, obtained from biometric information for registry that is acquired from registered users at enrollment, and a plurality of items of registered sub-feature information, obtained from the biometric information for registry, in association with each other;

a biometric information input unit for inputting to-be-verified biometric information of a to-be-verified user;

a to-be-verified sub-feature information obtaining unit which obtains a plurality of items of to-be-verified sub-feature information from the to-be-verified biometric information input by said biometric information input unit;

a to-be-verified sub-feature information assessing unit which assesses acquirement stability of an individual item of to-be-verified sub-feature information, based on the plurality of items of to-be-verified sub-feature information obtained by said to-be-verified sub-feature information obtaining unit; and a registered feature information narrowing unit which selects one or more pieces of registered feature information, of the previously registered feature information, to be subjected to the comparison, based on the plurality of items of to-be-verified sub-feature information and the plurality of items of registered sub-feature information, and on the acquirement stability assessment result obtained by said to-be-verified sub-feature information assessing unit in order to determine whether the to-be-verified user is among the registered users.

18. A biometric feature information narrowing apparatus as set forth in claim 17, wherein said registered feature information narrowing unit including:

a sub-feature information comparing unit which compares the plurality of items of to-be-verified sub-feature information and the plurality of items of registered sub-feature information associated with each piece of registered feature information, respectively, to obtain a comparison result value for each item of sub-feature information;

a match degree calculating unit which calculates a match degree between the plurality of items of to-be-verified sub-feature information and the plurality of items of registered sub-feature information for each piece of registered feature information, based on the comparison result values obtained by said sub-feature information comparing unit and on the acquirement stability assessment result obtained by said to-be-verified sub-feature information assessing unit; and a registered feature information selecting unit which selects said one or more pieces of registered feature information according to the match degrees calculated by said match degree calculating unit.

19. A biometric feature information narrowing apparatus as set forth in claim 18, wherein said match degree calculating unit weights the comparison result values, each obtained by said sub-feature information comparing unit for each item of sub-feature information, according to the acquirement stability assessment result, and calculates a total sum of weighted comparison result values to obtain a calculation result as the match degree for each piece of registered feature information.

20. A biometric feature information narrowing apparatus as set forth in claim 19, wherein the greater the acquirement stability, the greater the weights assigned to the comparison result values.

21. A biometric feature information narrowing apparatus as set forth in claim 19, further comprising:

a boundary value setting unit which provides one or more boundary values for each item of sub-feature information; and a sub-feature information categorizing unit which categorizes, for each item of sub-feature information, the registered sub-feature information and the to-be-verified sub-feature information according to the boundary values provided by said boundary value setting unit, said to-be-verified sub-feature information assessing unit evaluating, for each item of sub-feature information, whether or not any of such boundary values is present in a specific range of values whose center value is a value of each item of to-be-verified sub-feature information, as the acquirement stability, and then if the evaluation result is positive, the acquirement stability is assessed to be lower than where such boundary value is absent in the specific range, whereas if the evaluation result is negative, the acquirement stability is assessed to be higher than where such boundary value is present in the specific range, said sub-feature information comparing unit comparing, for each item of sub-feature information, the to-be-verified sub-feature information categorization result obtained by said sub-feature information categorizing unit with the registered sub-feature information categorization result obtained by said sub-feature information categorizing unit, and if the acquirement stability is assessed to be high, said match degree calculating unit assigning a higher weight to the comparison result value than where the acquirement stability is assessed to be low.

22. A biometric feature information narrowing apparatus as set forth in claim 18, further comprising:

a boundary value setting unit which provides one or more boundary values for each item of sub-feature information; and a sub-feature information categorizing unit which categorizes, for each item of sub-feature information, the registered sub-feature information and the to-be-verified sub-feature information according to the boundary values provided by said boundary value setting unit, said sub-feature information comparing unit comparing, for each item of sub-feature information, the to-be-verified sub-feature information categorization result obtained by said sub-feature information categorizing unit with the registered sub-feature information categorization result obtained by said sub-feature information categorizing unit.

23. A biometric feature information narrowing apparatus as set forth in claim 22, wherein said to-be-verified sub-feature information assessing unit evaluates, for each item of sub-feature information, whether or not any of such boundary values is present in a specific range of values whose center value is a value of each item of to-be-verified sub-feature information, as the acquirement stability.

24. A biometric feature information narrowing apparatus as set forth in claim 22,
wherein said biometric information input unit inputs to-be-verified biometric information obtained from a same body part more than one time to acquire more than one piece of to-be-verified biometric information,
wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information,
wherein said apparatus further comprises a statistical value calculating unit which calculates, for each item of sub-feature information, a statistical value of said each item of to-be-verified sub-feature information, based on the sets of to-be-verified sub-feature information pieces obtained from the same body part by said to-be-verified sub-feature information obtaining unit, and
wherein said boundary value setting unit determines, for each item of sub-feature information, at least one of a number of the boundary values and intervals among the boundary values, based on the statistical value calculated by said statistical value calculating unit.

25. A biometric feature information narrowing apparatus as set forth in claim 22,
wherein said biometric information input unit inputs to-be-verified biometric information obtained from a same body part more than one time to acquire more than one piece of to-be-verified biometric information,
wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information, and
wherein said sub-feature information categorizing unit categorizes, for each item of sub-feature information, the same item of more than one piece included in said sets of to-be-verified sub-feature information pieces, which is obtained from the same body part by said to-be-verified sub-feature information obtaining unit, according to the boundary value provided by said boundary value setting unit, and then outputs a category into which the most to-be-verified sub-feature information pieces are categorized, as a categorization result of the to-be-verified sub-feature information.

26. A biometric feature information narrowing apparatus as set forth in claim 25,
wherein said to-be-verified sub-feature information assessing unit evaluates, for each item of sub-feature information, whether or not the number of to-be-verified sub-feature information pieces categorized in the category which is output as the categorization result exceeds a specific threshold, as the acquirement stability, and wherein, if the evaluation result obtained by said to-be-verified sub-feature information assessing unit is negative, said match degree calculating unit excludes the sub-feature information from objects of the match degree calculation.

27. A biometric feature information narrowing apparatus as set forth in claim 22,
wherein said biometric information input unit inputs to-be-verified biometric information obtained from a same body part more than one time to acquire more than one piece of to-be-verified biometric information,
wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information,
wherein, for said each set of to-be-verified sub-feature information pieces, said sub-feature information categorizing unit categorizes, for each item of sub-feature information, categorizes the registered sub-feature information and the obtained to-be-verified sub-feature information, and said sub-feature information comparing unit performs comparison using the categorization result obtained by said sub-feature information categorizing unit, and said match degree calculating unit calculates the match degree, based on the comparison result value obtained by said sub-feature information comparing unit and on the acquirement stability assessment result obtained by said to-be-verified sub-feature information assessing unit,
wherein said apparatus further comprises a calculating unit which calculates at least one of a mean value and a median value of the match degrees, for said each piece of to-be-verified biometric information, as the statistical value, and
wherein the statistical value obtained by said calculating unit is used as a match degree of the to-be-verified sub-feature information of the same body part.

28. A biometric feature information narrowing apparatus as set forth in claim 18, wherein said match degree calculating unit excludes each item of to-be-verified sub-feature information whose acquirement stability is assessed to be low, from objects of the match degree calculation.

29. A biometric feature information narrowing apparatus as set forth in claim 17,
wherein said biometric information input unit inputs to-be-verified biometric information obtained from a same body part more than one time to acquire more than one piece of to-be-verified biometric information,
wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information,
wherein said apparatus further comprises a statistical value calculating unit which calculates, for each item of sub-feature information, a statistical value of said each item of to-be-verified sub-feature information, based on the sets of to-be-verified sub-feature information pieces obtained from the same body part by said to-be-verified sub-feature information obtaining unit, and
wherein said to-be-verified sub-feature information assessing unit assesses, for each item of sub-feature information, the acquirement stability, based on the statistical value calculated by said statistical value calculating unit.

30. A biometric feature information narrowing apparatus as set forth in claim 29,
   wherein said to-be-verified sub-feature information assessing unit evaluates, for each item of sub-feature information, whether or not the statistical value calculated by said statistical value calculating unit exceeds a specific threshold, as the acquirement stability, and
   wherein said match degree calculating unit excludes each item of to-be-verified sub-feature information which said to-be-verified sub-feature information assessing unit evaluates exceeds the threshold, from objects of the match degree calculation.

31. A biometric feature information narrowing apparatus as set forth in claim 17,
   wherein said biometric information input unit inputs to-be-verified biometric information obtained from a same body part more than one time to acquire more than one piece of to-be-verified biometric information,
   wherein said to-be-verified sub-feature information obtaining unit obtains the plurality of items of to-be-verified sub-feature information from each of said more than one piece of to-be-verified biometric information, to acquire a set of to-be-verified sub-feature information pieces for each piece of to-be-verified biometric information,
   wherein said apparatus further comprises a calculating unit which calculates, for each item of sub-feature information, at least one a mean value and a median value of said to-be-verified sub-feature information pieces, as the static value thereof, based on the sets of to-be-verified sub-feature information pieces obtained from the same body part by said to-be-verified sub-feature information obtaining unit, and
   wherein the static value obtained by said calculating unit for each item of sub-feature information is used as a to-be-verified sub-feature information acquirement result obtained by said to-be-verified sub-feature information obtaining unit.

32. A computer readable storing medium storing a biometric feature information narrowing program for a computer to function as a biometric feature information narrowing apparatus to narrow registered feature information to be subjected to comparison when biometric user verification is performed, and registered feature information, obtained from biometric information for registry that is acquired from registered users at enrollment, and a plurality of items of registered sub-feature information, obtained from the biometric information for registry, in association with each other, said program instructing the computer to function as the following:
   a to-be-verified sub-feature information obtaining unit which obtains a plurality of items of to-be-verified sub-feature information from the to-be-verified biometric information input by a to-be-verified user to said biometric information input unit;
   a to-be-verified sub-feature information assessing unit which assesses acquirement stability of an individual piece of to-be-verified sub-feature information, based on the plurality of items of to-be-verified sub-feature information obtained by said to-be-verified sub-feature information obtaining unit; and
   a registered feature information narrowing unit which selects one or more pieces of registered feature information, of the previously registered feature information, to be subjected to the comparison, based on the plurality of items of to-be-verified sub-feature information and the plurality of items of registered sub-feature information, and on the acquirement stability assessment result obtained by said to-be-verified sub-feature information assessing unit in order to determine whether the user to-be-verified is among the registered.

* * * * *

UNITED STATES PATENT AND TRADEMARK OFFICE
CERTIFICATE OF CORRECTION

| | | |
|---|---|---|
| PATENT NO. | : 7,646,893 B2 | Page 1 of 1 |
| APPLICATION NO. | : 10/970065 | |
| DATED | : January 12, 2010 | |
| INVENTOR(S) | : Shigefumi Yamada et al. | |

It is certified that error appears in the above-identified patent and that said Letters Patent is hereby corrected as shown below:

Column 41, Line 24, after "information" delete ",".

Column 41, Line 27, after "information" delete ",".

Column 41, Line 28, after "registry" delete ",".

Column 46, Line 9, after "information" delete ",".

Column 46, Line 12, after "feature information" delete ",".

Column 46, Line 35, change "registered." to --registered users.--.

Signed and Sealed this

Thirteenth Day of April, 2010

David J. Kappos
*Director of the United States Patent and Trademark Office*